United States Patent
Hu et al.

(10) Patent No.: US 10,999,741 B2
(45) Date of Patent: May 4, 2021

(54) ELECTRONIC EQUIPMENT IN WIRELESS COMMUNICATION SYSTEM AND WIRELESS COMMUNICATION METHOD

(71) Applicant: SONY CORPORATION, Tokyo (JP)

(72) Inventors: Bingshan Hu, Beijing (CN); Chen Sun, Beijing (CN); Yuxin Wei, Beijing (CN); Jinhui Chen, Beijing (CN); Xin Guo, Beijing (CN); Penshun Lu, Beijing (CN)

(73) Assignee: SONY CORPORATION, Tokyo (JP)

(*) Notice: Subject to any disclaimer, the term of this patent is extended or adjusted under 35 U.S.C. 154(b) by 71 days.

(21) Appl. No.: 15/743,049

(22) PCT Filed: Sep. 24, 2015

(86) PCT No.: PCT/CN2015/090527
§ 371 (c)(1),
(2) Date: Jan. 9, 2018

(87) PCT Pub. No.: WO2017/024659
PCT Pub. Date: Feb. 16, 2017

(65) Prior Publication Data
US 2018/0376339 A1    Dec. 27, 2018

(30) Foreign Application Priority Data

Aug. 13, 2015 (CN) .......................... 201510498448.5

(51) Int. Cl.
*H04W 16/14* (2009.01)
*H04L 5/00* (2006.01)
*H04L 27/00* (2006.01)

(52) U.S. Cl.
CPC ........... *H04W 16/14* (2013.01); *H04L 5/0058* (2013.01); *H04L 5/0098* (2013.01); *H04L 5/001* (2013.01);
(Continued)

(58) Field of Classification Search
CPC ... H04W 16/14; H04W 74/0808; H04W 4/02; H04W 4/029; H04W 88/08;
(Continued)

(56) References Cited

U.S. PATENT DOCUMENTS

2007/0242621 A1* 10/2007 Nandagopalan ...... H04L 12/413
370/254
2015/0124744 A1* 5/2015 Zhu .................... H04W 72/1257
370/329
(Continued)

FOREIGN PATENT DOCUMENTS

CN        104333873 A    2/2015
CN        104335661 A    2/2015
(Continued)

OTHER PUBLICATIONS

Extended Search Report issued in European Application 15900854.9-1219 dated Feb. 21, 2019.
(Continued)

*Primary Examiner* — George Eng
*Assistant Examiner* — Umair Ahsan
(74) *Attorney, Agent, or Firm* — Xsensus LLP

(57) ABSTRACT

An electronic equipment in a wireless communication system, and a wireless communication method. The wireless communication system includes at least one first cell and at least one second cell, and at least one of the second cells is operating in an unlicensed band. The electronic equipment includes one or more processing circuits configured to perform: configuring for a user equipment at least one second cell operating in an unlicensed band to perform carrier aggregation communication; and generating, dynamically or semi-statically, energy detection threshold information for each second cell operating in the unlicensed band so that the user equipment can perform energy detec-
(Continued)

tion on the unlicensed band according to the energy detection threshold information.

25 Claims, 11 Drawing Sheets

(52) U.S. Cl.
CPC ........ *H04L 5/0053* (2013.01); *H04L 27/0006* (2013.01)

(58) Field of Classification Search
CPC ............. H04W 74/0816; H04W 24/10; H04W 72/082; H04W 72/042
See application file for complete search history.

(56) References Cited

U.S. PATENT DOCUMENTS

| | | | | |
|---|---|---|---|---|
| 2015/0156650 | A1* | 6/2015 | Li | H04W 72/085 455/67.11 |
| 2015/0181593 | A1* | 6/2015 | Kim | H04W 52/0216 370/329 |
| 2016/0007350 | A1* | 1/2016 | Xiong | H04W 24/10 370/252 |
| 2016/0112944 | A1* | 4/2016 | Zhou | H04W 36/0072 370/338 |
| 2017/0118771 | A1* | 4/2017 | Kazmi | H04W 16/14 |
| 2017/0223738 | A1* | 8/2017 | Seo | H04W 74/08 |
| 2017/0245164 | A1* | 8/2017 | Jiang | H04W 24/08 |

FOREIGN PATENT DOCUMENTS

| | | |
|---|---|---|
| CN | 104683080 A | 6/2015 |
| EP | 2 832 167 A1 | 2/2015 |
| WO | 2015/066343 A1 | 5/2015 |

OTHER PUBLICATIONS

Nokia Networks, "On Design Options for LAA LBT Enabling Frequency Reuse", 3GPP TSG RAN WG1 Meeting #81, R1-152612, 5 Pages total, (May 25-29, 2015).
"3rd Generation Partnership Project; Technical Specification Group Radio Access Network; Study on Licensed-Assisted Access to Unlicensed Spectrum", (Release 13), 3GPP TR 36.889 V13.0.0 (Jun. 2015), Total 87 pages.
International Search Report dated May 5, 2016 in PCT/CN2015/090527 filed Sep. 24, 2015.
Office Action dated Jun. 23, 2020 in Chinese Patent Application No. 201510498448.5, 7 pages.

\* cited by examiner

ELECTRONIC EQUIPMENT IN WIRELESS COMMUNICATION SYSTEM AND WIRELESS COMMUNICATION METHOD

FIELD

The present disclosure relates to the technical field of wireless communications, and in particular to an electronic device in a wireless communication system and a wireless communication method in a wireless communication system.

BACKGROUND

This part provides background information related to the present disclosure, which is not necessarily the conventional technology.

With the development and evolution of wireless networks, more and more services are carried by the wireless networks. In this case, additional spectrum resources are required to support transmission of a large amount of data. Cellular wireless network operators start discussing how to use unlicensed spectrum resources such as the industrial scientific medical (ISM) frequency band of 5 GHz, while using the existing long term evolution (LTE) networks. On the other hand, the WiFi wireless industry deploys more WiFi systems in the unlicensed spectrum. Communication systems of different operators have equal rights to use the unlicensed frequency band. How to use the same unlicensed frequency band fairly and effectively is urgent to be solved in the industry. At present, a consensus reached in the industry is that the unlicensed frequency band needs to be used with the assistance of the licensed frequency band, and terminals are served through carrier aggregation.

For the coexistence of the two systems, in an existing method, different spectrum usage time periods are allocated to two different systems, and the two systems use the spectrum resources in a time division manner. LTE systems of different operators use the unlicensed frequency band simultaneously and perform spectrum usage backoff simultaneously, so that the WiFi systems have chances to use the spectrum. In this case, cells using the unlicensed frequency band belong to different operators are required to be synchronized. In addition, in order to ensure that the LTE systems and the WiFi systems coexist and use the spectrum resources in a time division manner, in the conventional technology, the LTE systems transmit WiFi signals, in this way, the WiFi systems can stop transmission for a time period, so that the LTE systems can perform transmission, which results in a great change in existing standards and chips.

Therefore, a new wireless communication technology solution is necessary to optimize use of an unlicensed spectrum without significantly changing the existing standards and chips.

SUMMARY

This part provides an overview of the present disclosure, rather than a full scope or all features of the present disclosure.

An object of the present disclosure is to provide an electronic device in a wireless communication system and a wireless communication method in a wireless communication system, to optimize use of an unlicensed spectrum with a reasonably-designed dynamic adjustment mechanism for an energy detection threshold without significantly changing the existing standards and chips.

An electronic device in a wireless communication system is provided in an aspect of the present disclosure, the wireless communication system includes at least one first cell and one or more second cells, and at least one of the one or more second cells operates in an unlicensed frequency band. The electronic device includes: at least one processing circuits configured to: configure the at least one second cell operating in the unlicensed frequency band for a user equipment, for carrier aggregation communication; and generate dynamically or semi-statically energy detection threshold information for each of the second cell operating in the unlicensed frequency band so that the user equipment performs energy detection on the unlicensed frequency band based on the energy detection threshold information.

A user equipment in a wireless communication system is provided in another aspect of the present disclosure, the wireless communication system includes at least one first cell and one or more second cells, and at least one of the one or more second cells operates in an unlicensed frequency band. The user equipment includes: a transceiver configured to receive configuration information on the at least one second cell operating in the unlicensed frequency band for carrier aggregation, and to receive energy detection threshold information for each of the second cell operating in the unlicensed frequency band; and at least one processing circuit configured to perform energy detection on the unlicensed frequency band based on the energy detection threshold information.

A base station in a wireless communication system is provided in another aspect of the present disclosure, where the base station manages a first cell operating in a licensed frequency band and a second cell operating in an unlicensed frequency band. The base station includes: at least one processing circuit configured to: generate multiple energy detection thresholds based on a network status and contain the multiple energy detection thresholds into first signaling; and generate, for the second cell, an energy detection threshold indication for indicating one of the multiple energy detection thresholds so that the user equipment performs energy detection on the unlicensed frequency band corresponding to the second cell based on the energy detection threshold indication; and containing the energy detection threshold indication into second signaling, where a transmission interval of the first signaling is longer than a transmission interval of the second signaling.

A user equipment in a wireless communication system is provided in another aspect of the present disclosure, the wireless communication system includes one first cell and one or more second cells, and at least one of the one or more second cells operates in an unlicensed frequency band. The user equipment includes: a transceiver; and at least one processing circuit configured to: cause the transceiver to receive first signaling containing multiple energy detection thresholds from a base station serving the user equipment; cause the transceiver to receive, from the base station, second signaling containing an energy detection threshold indication for indicating one of the multiple energy detection thresholds; and perform energy detection on the unlicensed frequency band based on the energy detection threshold indication, where a transmission interval of the first signaling is longer that a transmission interval of the second signaling.

A wireless communication method in a wireless communication system is provided in another aspect of the present disclosure, the wireless communication system includes at least one first cell and one or more second cells, and at least one of the one or more second cells operates in an unlicensed frequency band. The wireless communication method includes: configuring, for a user equipment, the at least one second cell operating in the unlicensed frequency band, for carrier aggregation communication; and generating dynamically or semi-statically energy detection threshold information for each of the second cell operating in the unlicensed frequency band so that the user equipment performs energy detection on the unlicensed frequency band based on the energy detection threshold information.

A wireless communication method in a wireless communication system is provided in another aspect of the present disclosure, the wireless communication system includes at least one first cell and one or more second cells, and at least one of the second cells operates in an unlicensed frequency band. The wireless communication method includes: receiving configuration information on the at least one second cell operating in the unlicensed frequency band for carrier aggregation; receiving energy detection threshold information for each of the second cell operating in the unlicensed frequency band; and performing energy detection on the unlicensed frequency band based on the energy detection threshold information.

A wireless communication method in a wireless communication system is provided in another aspect of the present disclosure. A base station in the wireless communication system manages a first cell operating in an unlicensed frequency band and a second cell operating in an unlicensed frequency band. The wireless communication method includes: generating multiple energy detection thresholds based on a network status, and containing the multiple energy detection thresholds into first signaling; and generating, for the second cell, an energy detection threshold indication for indicating one of the multiple energy detection thresholds so that a user equipment performs energy detection on the unlicensed frequency band corresponding to the second cell based on the energy detection threshold indication, and containing the energy detection threshold indication into second signaling, where a transmission interval of the first signaling is longer than a transmission interval of the second signaling.

A wireless communication method in a wireless communication system is provided in another aspect of the present disclosure, the wireless communication system includes one first cell and one or more second cells, and at least one of the one or more second cells operates in an unlicensed frequency band. The wireless communication method includes: receiving, from a base station serving a user equipment, first signaling containing multiple energy detection thresholds; receiving, from the base station, a second signaling containing an energy detection threshold indication for indicating one of the multiple energy detection thresholds; and performing energy detection on the unlicensed frequency band based on the energy detection threshold indication, where a transmission interval of the first signaling is longer than a transmission interval of the second signaling.

With the electronic device in the wireless communication system and the wireless communication method in the wireless communication system according to the present disclosure, energy detection threshold information is generated dynamically or semi-statically for a second cell operating in an unlicensed frequency band, a user equipment performs energy detection on the unlicensed frequency band based on the energy detection threshold information varying dynamically or semi-statically, and the user equipment may perform transmission using the second cell operating in the unlicensed frequency band in a case where energy of the unlicensed frequency band detected by the user equipment is less than an energy detection threshold, and the user equipment cannot perform transmission using the second cell operating in the unlicensed frequency band in a case where energy of the unlicensed frequency band detected by the user equipment is not less than an energy detection threshold, thereby optimizing use of an unlicensed spectrum with the reasonably-designed dynamic adjustment mechanism for the energy detection threshold.

Further applicability range is apparent from the description provided herein. The description and specific examples in the overview are merely for the purpose of illustration and are not intended to limit the scope of the present disclosure.

BRIEF DESCRIPTION OF THE DRAWINGS

The drawings described herein are provided merely for the purpose of illustrating the selected embodiments rather than all possible embodiments, and are not intended to limit the scope of the present disclosure. In the drawings.

Figure 1:
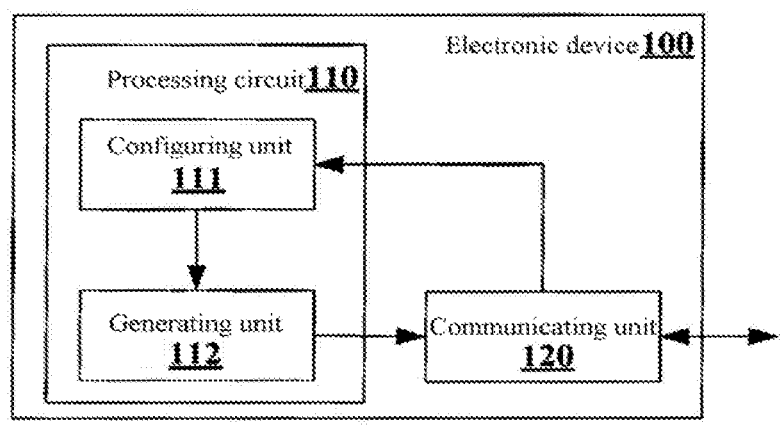
FIG. 1 is a block diagram showing a structure of an electronic device in a wireless communication system according to an embodiment of the present disclosure.

While specific embodiments of the present disclosure are shown as examples in the drawings and are described here in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

A user equipment (UE) in the present disclosure includes but is not limited to a terminal having a wireless communication function such as a mobile terminal, a computer or an in-vehicle apparatus. Further, depending on a function described, the UE in the present disclosure may also be the UE itself or a component such as a chip in the UE. Similarly, a base station in the present disclosure may be, for example, an evolution node base station (eNB) or a component such as a chip in the eNB.

The present disclosure relates to a licensed assisted access (LAA)-Long Term Evolution (LTE) communication in a wireless communication network. In a case where multiple systems use a same unlicensed frequency band, coordination is required to allow the systems to have equal rights to use the unlicensed frequency band. The unlicensed frequency band herein may be, for example, a WiFi frequency band of 2.4 GHz or 5 GHz, or a licensed frequency band such as a television frequency band or a radar frequency band for a non-cellular network. In order to realize the coordination while reducing inter-system communication overhead, a dynamic adjustment mechanism for an energy detection threshold of a terminal is provided in the present disclosure, and an adverse effect caused by uncertainty of occupying the unlicensed frequency band can be reduced with the dynamic adjustment mechanism. For example, an LTE system may adjust dynamically the energy detection threshold based on an interference status and a load status of an available unlicensed spectrum, and notify the user equipment, to effectively use the unlicensed frequency band and equally coexist with other communication devices using the unlicensed frequency band. In addition, multiple solutions are provided in the present disclosure to dynamically notify of the energy detection threshold. Coordination usage scenarios of unlicensed frequency band resources in the present disclosure may include, for example, coordination between different systems such as between an LTE system and a WiFi system and between an LTE system and a bluetooth system, coordination between same systems across LTE operators, and coordination among multiple communication devices served by a same LTE operator.

FIG. 1 shows a structure of an electronic device 100 in a wireless communication system according to an embodiment of the present disclosure.

As shown in FIG. 1, the electronic device 100 may include a processing circuit 110. It should be noted that the electronic device 100 may include one processing circuit 110 or multiple processing circuits 110. The electronic device 100 may further include a communicating unit 120. The electronic device 100 is arranged on a network side in the wireless communication system to serve the user equipment in the system.

Further, the processing circuit 110 may include various discrete functional units to perform various different functions and/or operations. It should be noted that the functional units may be physical entities or logical entities, and units referred to as different names may be implemented as a same physical entity.

For example, as shown in FIG. 1, the processing circuit 110 may include a configuring unit 111 and a generating unit 112.

A wireless communication system according to an embodiment of the present disclosure includes at least one first cell and one or more second cells, and at least one of the second cells operates in an unlicensed frequency band. The first cell and the second cells are managed by the electronic device 100. The configuring unit 112 configures the at least one second cell operating in the unlicensed frequency band for a user equipment, for carrier aggregation communication.

According to an example of the present disclosure, the user equipment obtains a radio transmission service in a manner of general carrier aggregation including one primary cell (Pcell) and one or more secondary cells (Scells) based on a configuration on a network side. For example, the configuring unit 112 of the electronic device 100 generates high-layer signaling including configuration information on the secondary cell, for example, RRC signaling including an information element (IE) of sCellToAddModList, to allow the user equipment to determine an available secondary cell. The configuration information on the secondary cell includes a cell configuration such as a cell index, a physical cell ID and a carrier frequency. In this case, the first cell mentioned above refers to a Pcell, while the second cell refers to an Scell. Typically, one cell corresponds to one carrier in a specific frequency, for example, the Pcell corresponds to a primary component carrier (PCC) and the Scell corresponds to a secondary component carrier (SCC).

Therefore, in some of the following examples, the applicant does not distinguish references of the cell and the carrier, and those skilled in the art can understand the meaning of the references.

In another example of the present disclosure, the user equipment operates in a dual connectivity (DC) scenario. In the DC scenario, the UE is connected to two eNBs (a primary eNB and a secondary eNB), and serving cells of the UE include a master cell group (MCG) and a secondary cell group (SCG), respectively. The MCG includes one Pcell and one or more Scells, and the SCG includes one PSCell (i.e., a primary cell in the secondary cell group) and optionally one or more Scells. In an example of DC, the PSCell may also be an example of the first cell mentioned above and may carry a detection threshold indication for other Scells in the SCG.

Furthermore, in another example of the present disclosure, the Scells serving the user equipment may include an Scell operating in a licensed frequency band. In a case that the Scell is configured with physical downlink control channel (PDCCH) transmission in the licensed frequency band, the Scell æ°Ê transmit a detection threshold for an Scell operating in an unlicensed frequency band. In other words, in this case, the first cell mentioned above may also be the Scell.

In the following, the general carrier aggregation is taken as an example for description, that is, in the description, the Pcell serves as the first cell and the Scell serves as the second cell.

In the electronic device 100 shown in FIG. 1, the generating unit 112 may generate dynamically or semi-statically energy detection threshold information for each of the second cell operating in the unlicensed frequency band, and the UE performs energy detection on the unlicensed frequency band based on the energy detection threshold information.

With the electronic device 100 according to the embodiment of the present disclosure, energy detection threshold information may be generated dynamically or semi-statically for each of the second cell operating in an unlicensed frequency band, and the UE can perform energy detection on the unlicensed frequency band based on the energy detection threshold information varying dynamically or semi-statically.

In a case where energy of the unlicensed frequency band detected by the UE is less than an energy detection threshold, the UE may consider that no other device transmits in the unlicensed frequency band currently or that transmission in the unlicensed frequency band does not cause harmful interference to other devices, and thus the UE may perform transmission using the second cell operating in the unlicensed frequency band. In a case where energy of the unlicensed frequency band detected by the UE is not less than the energy detection threshold, the UE cannot perform transmission using the second cell operating in the unlicensed frequency band. In this way, the energy detection threshold is dynamically or semi-statically adjusted for each of the second cell on the network side in a centralized manner, therefore, the accuracy of detection and spectrum efficiency of a system can be improved as compared with a static energy detection threshold solution or a uniform energy detection threshold solution for different cells, and furthermore, as compared with an energy detection threshold solution determined on the UE side, the complexity and the energy consumption of the UE can be reduced, and the energy detection threshold solution determined on the network side is equal and efficient without being subject to individual limitations of UEs.

However, another technical problem to be researched is, after the energy detection threshold is adjusted on the network side, how to effectively notify the UE of the adjusted energy detection threshold. According to a preferred embodiment of the present disclosure, the processing circuit 110 may generate physical layer control signaling, such as downlink control information (DCI) carried by the PDCCH, including an energy detection threshold indication for each of the second cell operating in the unlicensed frequency band. In view of a transmission period of the physical layer signaling, the processing circuit 110 may dynamically notify of the energy detection threshold. However, since the physical layer control signaling is transmitted frequently in the network, transmission resource overhead is huge and the number of bits carried in the physical layer is limited strictly. The following preferred solution is further provided in a case where energy detection thresholds for multiple second cells operating in the unlicensed frequency band are required to be notified to the UE, to contain all energy detection threshold indications in limited physical layer control signaling, that is, the energy detection threshold information is contained in a DCI format 1C by reusing the DCI format 1C, and is notified to the UE.

In the 3rd generation partnership project (3GPP) Rel-12, the DCI format 1C is used for compactly scheduling for one codeword of a physical downlink shared channel (PDSCH), to notify a change in a multicast control channel (MCCH), and reconfigure time division duplexing (TDD).

If the DCI format 1C is used for an uplink (UL)/downlink (DL) configuration indication, the following information is transmitted by means of the DCI format 1C.

UL/DL configuration number 1, UL/DL configuration number 2, . . . , UL/DL configuration number I.

where each of the UL/DL configuration occupies 3 bits, $$I = \left\lfloor \frac{L_{format\ 1c}}{3} \right\rfloor,$$

and $L_{format\ 1c}$ equals to a size of a payload of the format 1C for compactly scheduling of one PDSCH codeword. Indexes for the UL/DL configuration indications of the serving cells are determined based on a parameter eimta-ReConfigIndex provided by a higher layer. A bit of zero is added until a size of the information is equal to a size of the format 1C for compactly scheduling for one PDSCH codeword.

In the Rel-12, a TDD configuration on each carrier (licensed frequency band) may be dynamically changed by the DCI format 1C. However, performances of the system cannot be improved necessarily by dynamically changing a TDD configuration in an unlicensed frequency band due to a time limit of occupying the unlicensed frequency band by an LTE system and existence of an incomplete subframe, and information bit resources carrying the TDD configuration may be wasted.

In the present disclosure, an energy detection threshold can be dynamically adjusted by reusing the DCI format 1C, thereby effectively notifying of the energy detection threshold without adding a new information bit and without changing an original signaling structure.

According to a preferred embodiment of the present disclosure, the processing circuit 110 may reuse a bit in a DCI format 1C for indicating an uplink and downlink configuration of the second cell as a bit for an energy detection threshold indication used when energy detection is performed for the second cell operating in the unlicensed frequency band. The energy detection threshold indication herein may be, for example, an index such as a serial number.

Figure 2A:
FIG. 2A is a schematic diagram showing a format of a downlink control information (DCI) format 1C designated for dynamically adjusting an energy detection threshold.

FIG. 2A shows an example of a format of a DCI format 1C designated for dynamically adjusting an energy detection threshold.

As shown in FIG. 2A, in the general carrier aggregation, after reusing the DCI format 1C signaling, bits indicate as follows:

bits 0 to 2 indicate a TDD configuration (there are 7 types of TDD configuration) of a Pcell;

bits 3 to 5 indicate an energy detection threshold indication ED1 used when a UE of Scell-1 performs energy detection;

bits 6 to 8 indicate an energy detection threshold indication ED2 used when a UE of Scell-2 performs energy detection;

bits 9 to 11 indicate an energy detection threshold indication ED3 used when a UE of Scell-3 performs energy detection; and bits 12 to 14 indicate an energy detection threshold indication ED4 used when a UE of Scell-4 performs energy detection.

It should be noted that, as described above, a dynamic TDD UL/DL configuration is not required in a case where the Scell operates in the unlicensed frequency band. In some examples, a part of multiple Scells configured for the UE operate in the unlicensed frequency band and the other part operate in a licensed frequency band. Similar to the Pcell, a bit in the DCI format 1C of the Scells operating in the licensed frequency band is still used to indicate the UL/DL configuration. In other words, only indication bits for a part of the Scells may be changed in the DCI format 1C.

Energy detection threshold information can be dynamically generated by reusing the DCI format 1C as shown in FIG. 2A. It should be noted that, an optional example is further provided in the present disclosure, in which, the energy detection threshold information is carried by reusing a filling bit in the DCI format 1C without changing meanings of indication bits for a TDD UL/DL configuration. In an example, energy detection threshold indications of multiple second cells are ranked from a specific position in the filling bit (for example as ruled in the protocol) in a predetermined order for example an ascending order of cell indexes, so that the UE may obtain energy detection thresholds of the second cell based on previous configuration information on the second cells.

In the case where an energy detection threshold is adjusted dynamically by reusing the DCI format 1C as described above, all UEs on the network side may receive the energy detection threshold and perform energy detection based on the energy detection threshold. According to a preferred embodiment of the present disclosure, the following preferred solution is further provided in a case where the energy detection threshold is notified to one or more special UEs, to contain the energy detection threshold indication into limited physical layer control signaling.

In a preferred embodiment, the energy detection threshold information is contained into DL grant by reusing a DL grant in the DCI, and is notified to the UE. In the 3GPP Rel-12, the DL grant belongs to a part of DCI information, and a DCI format 1/1A/1B/1D/2/2A/2B/2C/2D is used to represent UE dedicated signaling, therefore, the energy detection threshold information may be transmitted to the specific UE.

In a preferred embodiment, the energy detection threshold information is contained in DCI format 3/3A by reusing the DCI format 3/3A in the DCI, and is notified to the UE. In the 3GPP Rel-12, the DCI format 3/3A is used to represent a UE group dedicated signaling, therefore, the energy detection threshold information may be transmitted to multiple specific UEs. For example, the following information is transmitted by means of the DCI format 3/3A:

energy detection threshold information for a first UE, energy detection threshold information for a second UE, . . . , energy detection threshold information for an N-th UE.

According to a preferred embodiment of the present disclosure, the processing circuit 110 may contain the energy detection threshold information in media access control (MAC) signaling and notify the UE. In view of a transmission period of the MAC signaling, the processing circuit 110 may semi-statically generate the energy detection threshold information.

Figure 2B:
FIG. 2B is a schematic diagram showing a MAC control unit for an energy detection threshold.

For example, an MAC control unit for the energy detection threshold may be identified by a header of a MAC protocol data unit (PDU) having a specific logical channel identity (LCID). For example, one of indexes ranging from 01011 to 11001 is selected as a value of the LCID of the MAC control unit for the energy detection threshold. Upon receiving the signaling, the UE determines whether a MAC control unit corresponding to a header of MAC PDU indicates an energy detection threshold by detecting the LCID included in the header. FIG. 2B shows an example of an MAC control unit for an energy detection threshold.

The MAC control unit for the energy detection threshold as shown in FIG. 2B has a fixed size and consists of two octets (Oct1 and Oct2). In FIG. 2B, R represents a reserved bit and is set to be "0". A field indicating an energy detection threshold for each Scell has a length of 3 bits.

According to a preferred embodiment of the present disclosure, the processing circuit 110 may also contain the energy detection threshold information into radio resource control (RRC) signaling and notify the UE. In view of a transmission period of the RRC signaling, the processing circuit 110 may semi-statically generate the energy detection threshold information. It should be noted that the energy detection threshold information contained in the RRC signaling may be either an energy detection threshold indication (e.g., an index of 3 bits in the above example) or an energy detection threshold (e.g., x dBm).

For example, new RRC signaling, i.e., an information element of the LAA energy detection threshold, may be defined in a RadioResourceConfigCommonSIB. For example, the following format may be used:

Format: energy detection threshold INTEGER (−92 . . . −60) dBm.

According to an embodiment of the present disclosure, the energy detection threshold information may include an energy detection threshold. Preferably, the energy detection threshold information may include an energy detection threshold indication for the second cell operating in the unlicensed frequency band. In the case where the energy detection threshold information includes the energy detection threshold indication, the processing circuit 110 may contain multiple candidate energy detection thresholds into dedicated signaling and notify the UE before generating the energy detection threshold information. In this case, the UE first obtains the multiple candidate energy detection thresholds and indexes corresponding to the thresholds ó° the dedicated signaling (or subsequent broadcast signaling), and then receives an indication including the indexes for the energy detection thresholds via subsequent physical-layer signaling or MAC signaling, in this case, energy detection thresholds for different Scells in the unlicensed frequency band can be searched for and determined. In another example, the multiple candidate energy detection thresholds and the corresponding indexes are preset parameters of the system and are stored in advance in the processing chip (e.g., a storage unit) of the UE, and the UE may directly determine energy detection thresholds for different cells upon receiving the energy detection threshold indication.

Specifically, for example, the processing circuit 110 may contain multiple candidate energy detection thresholds into the RRC signaling and notify the UE, which reduce transmission resource overhead, as compared with a solution in which a specific energy detection threshold is notified each time. As compared with a solution in which candidate energy detection thresholds are written into a chip in advance, the notification manner with the dedicated signaling can adapt to a change in an operating state of a specific system with a higher flexibility. As compared with a broadcasting manner mentioned below, different candidate energy detection thresholds can be set for different UEs on the network side in the notification manner with the dedicated signaling, to realize the differentiated service. For example, the UEs may be classified as a high-priority UE and a low-priority UE based on priorities, and the processing circuit 110 may set a candidate energy detection threshold of the high-priority UE to be greater than a candidate energy detection threshold of the low-priority UE, so that the high-priority UE easily accesses to the Scell in the unlicensed frequency band. The priority is classified as a high priority and a low priority based on a factor such as a business type and geographical location of a UE, which are not described in detail herein.

In addition, the candidate energy detection thresholds may also be broadcasted in a broadcast message. For example, the candidate energy detection thresholds may be notified to the UE by broadcasting system information carried by a broadcast control channel (BCCH). As compared with other notification manner for the candidate energy detection thresholds, in the broadcasting manner, not only a flexibility requirement of the system can be met to a certain extent, and the candidate energy detection thresholds can be notified to the UEs in a whole range of a cell with less radio resource overhead.

Figure 3:
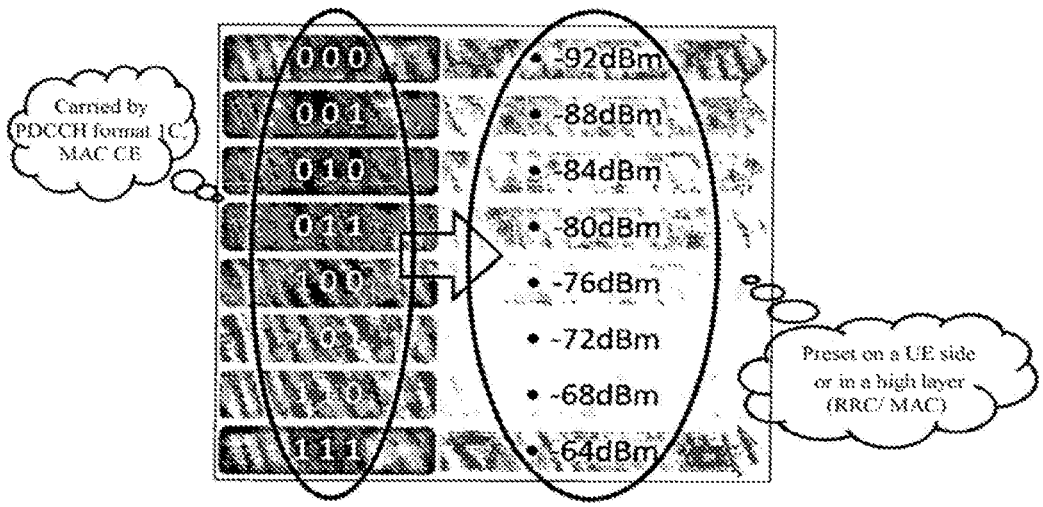
FIG. 3 is a schematic diagram showing a mapping relationship between an energy detection threshold indication and an energy detection threshold.

FIG. 3 shows a mapping relationship between an energy detection threshold indication and an energy detection threshold. As shown in FIG. 3, data of 3 bits on the left represents an energy detection threshold indication carried by a PDCCH format 1C or a MAC control unit (CE) and the like, and a decibel on the right represents an energy detection threshold preset on a UE side or in a high layer (RRC/MAC). Upon receiving an energy detection threshold indication, the UE may obtain an energy detection threshold by referring to the mapping table shown in FIG. 3.

Figure 4:
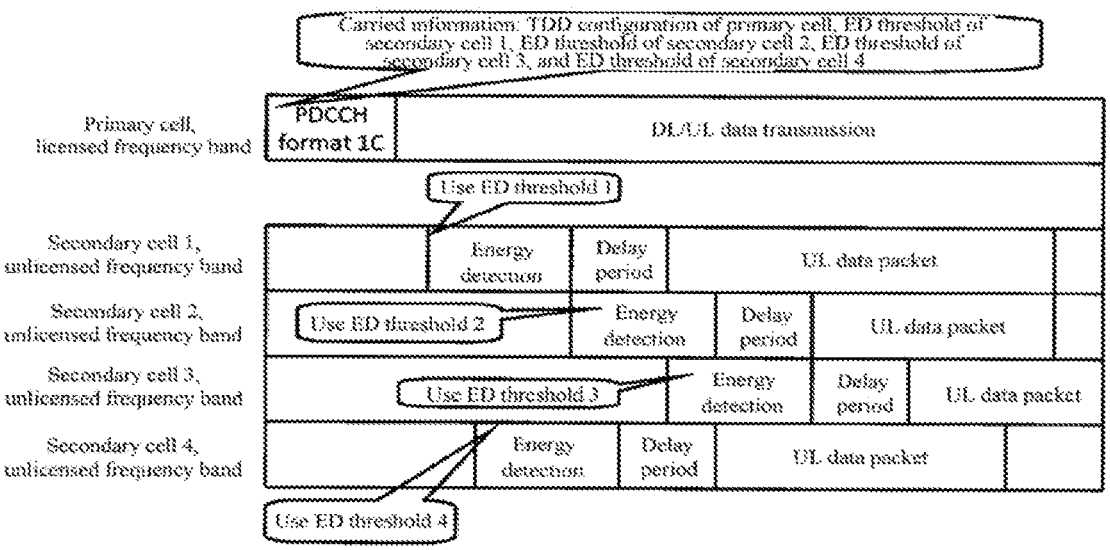
FIG. 4 is a schematic diagram showing a fast adjustment method for an energy detection threshold according to an embodiment of the present disclosure.

FIG. 4 shows an example of a fast adjustment method for an energy detection threshold according to an embodiment of the present disclosure. As shown in FIG. 4, a primary cell Pcell operating in a licensed frequency band may carry the following information in a PDCCH format 1C: a TDD configuration of the Pcell; energy detection (ED) threshold 1 of a first secondary cell Scell 1 operating in an unlicensed frequency band; ED threshold 2 of a second secondary cell Scell 2 operating in the unlicensed frequency band; ED threshold 3 of a third secondary cell Scell 3 operating in the unlicensed frequency band; and ED threshold 4 of a fourth secondary cell Scell 4 operating in the unlicensed frequency band. Next, energy detection is performed on Scell 1 operating in the unlicensed frequency band with the ED threshold 1. Scell 1 is unavailable if the detected signal energy is not less than the ED threshold 1, and Scell 1 is available if the detected signal energy is less than the ED threshold 1. If Scell 1 is still available after a delay period, data can be uploaded.

Similarly, energy detection is performed on Scell 2, Scell 3, and Scell 4 operating in the unlicensed frequency band with the ED threshold 2, the ED threshold 3, and the ED threshold 4, respectively. If the secondary cells are still available after the delay period, data can be uploaded.

It should be noted that, energy detection before uplink transmission is taken as an example in FIG. 4 for description, and the UE may further be configured to perform energy detection in a manner according to the present disclosure before downlink transmission with Scells in the unlicensed frequency band on a network side, and a downlink transmission scheme is determined based on a feedback for a detection result of the UE.

According to a preferred embodiment of the present disclosure, the processing circuit 110 may generate energy detection threshold information based on traffic load and/or a channel idle probability of the unlicensed frequency band.

For example, the processing circuit 110 may generate energy detection threshold information based on traffic load in the unlicensed frequency band. If the traffic load in the unlicensed frequency band is high, the processing circuit 110 may set a low energy detection threshold, thereby reducing load in the unlicensed frequency band.

On the other hand, the processing circuit 110 may generate energy detection threshold information based on traffic load in the licensed frequency band. If the traffic load in the licensed frequency band is high, the processing circuit 110 may set a high energy detection threshold, thereby raising a possibility that the unlicensed frequency band participates in shunting the traffic load.

In addition, the processing circuit 110 may generate energy detection threshold information based on the channel idle probability (statistical information) of the unlicensed frequency band. If the channel idle probability of the unlicensed frequency band is high, the processing circuit 110 may set a high energy detection threshold, thereby raising a possibility that the unlicensed frequency band participates in channel transmission.

In practice, the processing circuit 110 may also generate energy detection threshold information based on the traffic load as well as the channel idle probability of the unlicensed frequency band.

The processing circuit 110 may also generate energy detection threshold information based on transmission power of a transceiver. The energy detection threshold information has a linear relationship with the transmission power of the transceiver.

According to a preferred embodiment of the present disclosure, the processing circuit 110 (e.g., the generating unit 112) may generate energy detection threshold information based on energy detection threshold indication information received from other electronic device. For example, the same or approximate thresholds may be set by different eNBs, for fair use of the unlicensed frequency band.

According to a preferred embodiment of the present disclosure, the processing circuit 110 (e.g., the generating unit 112) may generate high-layer signaling, such as RRC signaling, including configuration information on an energy detection report for the user equipment. The configuration information on the energy detection report may include a report parameter related to at least one of a periodic energy detection report and a non-periodic energy detection report.

According to a preferred embodiment of the present disclosure, the user equipment may report the energy detection report periodically or non-periodically, for example, the user equipment may accidently report the energy detection report. A communicating unit 120 may transmit the high-layer signaling, including the configuration information on the energy detection report for the user equipment, generated by the processing circuit 110 to the user equipment after the high-layer signaling is generated by the processing circuit 110. Next, the user equipment reports an energy detection report based on the configuration information.

According to a preferred embodiment of the present disclosure, the configuration information on the energy detection report may include a period of the periodic energy detection report and/or a triggering condition for the non-periodic energy detection report. The user equipment may periodically report in the period of the periodic energy detection report, or may non-periodically report based on the triggering condition for the non-periodic energy detection report.

According to a preferred embodiment of the present disclosure, the user equipment may include one or more timers and one or more counters, for periodically and/or non-periodically reporting the energy detection report.

The user equipment performs energy detection based on a given energy detection threshold. In a case where the detected energy is less than the energy detection threshold, the user equipment may consider that no other device transmits in the frequency band currently, or that transmission of the user equipment in the frequency band does not cause harmful interference to other devices, and thus the user equipment can transmit in the frequency band, which is considered as successful energy detection. On the contrary, in a case where the detected energy is not less than the energy detection threshold, the user equipment may consider that other device transmits in the frequency band currently, or that transmission of the user equipment in the frequency band can cause harmful interference to other devices, and thus the user equipment cannot transmit in the frequency band, which is considered as failed energy detection. The one or more counters in the user equipment may count the number of failed energy detection for the given energy detection threshold.

Therefore, the period of the periodic energy detection report and/or the triggering condition for the non-periodic energy detection report may include timing threshold configurations of one or more timers, and may include one or more counting threshold configurations related to failed energy detection. In addition, the period of the periodic energy detection report and/or the triggering condition for the non-periodic energy detection report may further include one or more threshold configurations related to a failure rate of energy detection.

According to a preferred embodiment of the present disclosure, the timing threshold configurations may be included in a MAC-MainConfig cell of the RRC signaling.

It should be noted that according to an embodiment of the present disclosure, the wireless communication system described above may be a Long Term Evolution-Advanced (LTE-A) cellular communication system, the electronic device 100 may be a base station, and the electronic device 100 may further include the communicating unit 120 such as a transceiver. The communicating unit 120 may, for example, transmit the energy detection threshold information via an air interface.

According to a preferred embodiment of the present disclosure, the first cell operates in a licensed frequency band, and the transceiver included in the electronic device 100 may transmit the energy detection threshold information through the first cell.

A flow diagram of an adjustment method for an energy detection threshold in the LAA according to an embodiment of the present disclosure is described below with reference to FIG. 5, which shows a timing diagram of a fast adjustment method for an energy detection threshold according to an embodiment of the present disclosure.

Figure 5:
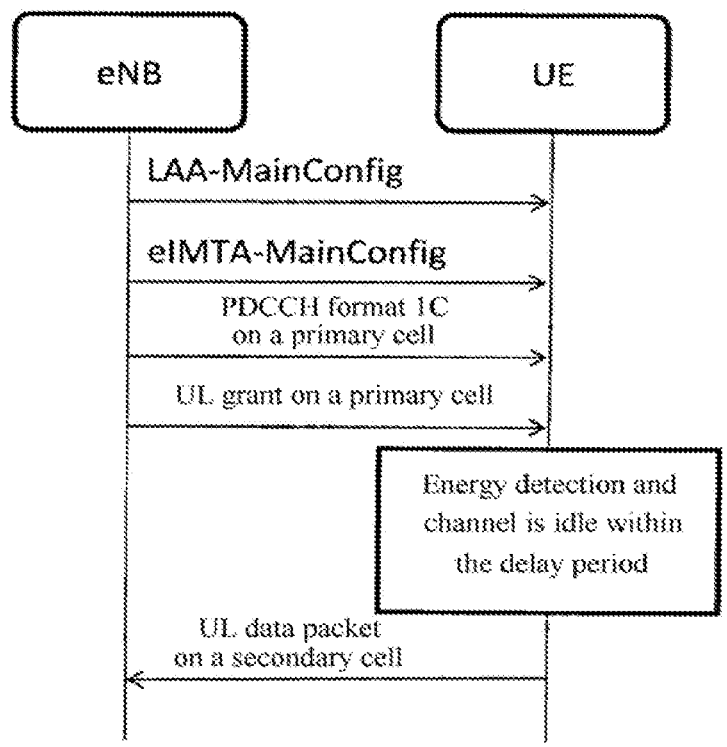
FIG. 5 is a timing diagram showing a fast adjustment method for an energy detection threshold according to an embodiment of the present disclosure.

As shown in FIG. 5, first, the eNB configures signaling supporting the LAA via the RRC. The UE determines to read a DCI format 1c in the PDCCH in the manner of the present disclosure based on the signaling.

Specifically, the signaling may be indicated using a dedicated RRC Information Element (IE) such as LAA-Main-Config.

More specifically, the signaling may be indicated using an existing RRCConnectionReconfiguration message. In the RRCConnectionReconfiguration message, dl-CarrierFreq indicates a downlink carrier frequency of a secondary cell (in a frequency division duplexing (FDD) system with asymmetric uplink and downlink, ul-CarrierFreq is further contained to indicate an uplink carrier frequency). The RRCConnectionReconfiguration message is transmitted by the base station when the base station adds an scell to the UE for carrier aggregation, and the UE may determine whether the scell is an LAA cell (operating in the unlicensed frequency band) by reading a carrier frequency indication in the message.

RRCConnectionReconfiguration Message

```
SCellToAddModList ::=   SEQUENCE (SIZE (1..maxSCell)) OF
SCellToAddMod
SCellToAddMod ::=       SEQUENCE {
    sCellIndex                 SCellIndex,
    cellIdentification         SEQUENCE {
        physCellId                 PhysCellId,
        dl-CarrierFreq             ARFCN-ValueEUTRA
    ul-CarrierFreq             ARFCN-ValueEUTRA
    }
```

Next, the eNB configures a signaling eIMTA-MainConfig supporting the enhanced interference mitigation and traffic adaptation (eIMTA) via the RRC. The UE determines to read a DCI format 1c in the PDCCH in the manner of the present disclosure based on the signaling. The signaling includes content as follows.

```
EIMTA-MainConfig-r12 ::=  CHOICE {
    release                   NULL,
    setup                     SEQUENCE {
        eimta-RNTI-r12            C-RNTI,
        eimta-CommandPeriodicity-r12 ENUMERATED {sf10, sf20, sf40, sf80},
        eimta-CommandSubframeSet-r12 BIT STRING (SIZE(10))
    }
}
``` where eimta-CommandPeriodicity is used to configure a period to monitor the PDCCH scrambled by the enhanced interference mitigation and traffic adaptation radio network temporary identifier (eIMTA-RNTI)(see TS 36.213), sf10 corresponds to 10 subframes, sf20 corresponds to 20 subframes, and so on.

In addition, eimta-CommandSubframeSet is used to configure subframes to monitor the PDCCH scrambled by the eIMTA-RNTI within the period configured through the eimta-CommandPeriodicity 10 bits correspond to all subframes in a last radio frame within each period.

Next, the UE may obtain an energy detection threshold for each Scell operating in the unlicensed frequency band by monitoring and decoding the PDCCH scrambled by the eIMTA-RNTI on the TDD/FDD Pcell.

Next, if the UE is to transmit uplink data in the unlicensed frequency band, for example, the UE may transmit an uplink transmission scheduling request (SR) to the eNB, and the eNB needs to transmit uplink grant signaling (UL grant) to the UE.

Next, upon receiving the uplink grant, the UE performs energy detection based on an energy detection threshold carried by the PDCCH format 1C. If there are available frequency resources in the unlicensed frequency band after a delay period, the uplink data is transmitted.

From the flow shown in FIG. 5, before performing uplink transmission using the Scell operating in the unlicensed frequency band, the UE may determine whether the Scell is available based on the threshold detection. On the other hand, the base station may determine whether the downlink resource is available for the UE, to find a hidden node that cannot be detected on the base station side.

Figure 6:
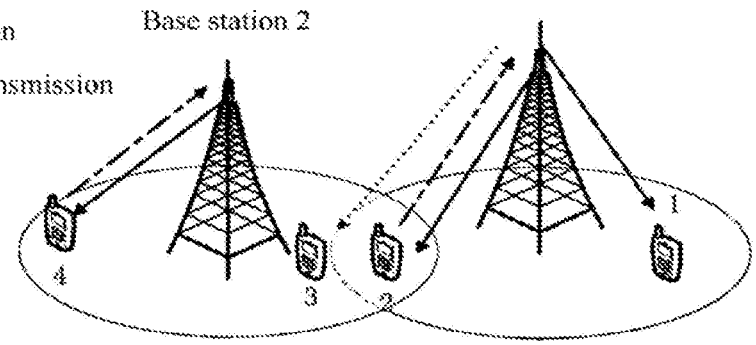
FIG. 6 is a schematic diagram showing a hidden node scenario in which a fast adjustment method for an energy detection threshold according to an embodiment of the present disclosure may be applied.

FIG. 6 shows a hidden node scenario in which a fast adjustment method for an energy detection threshold according to an embodiment of the present disclosure may be applied. In the scenario as shown in FIG. 6, the base station 1 is using the unlicensed frequency band, and the base station 2 normally detects interference by itself before performing LAA downlink transmission, and no interference may be detected (the base station 1 is a hidden node) by the base station 2, in this case, serious interference is caused to users such as UE3 and UE2 at the edge of the base stations 1 and 2 when the base station 2 and the base station 1 transmit in the same frequency band.

In view of this, before transmitting in the unlicensed frequency band, the base station 2 may configure a user equipment such as UE3 at the edge of the cell to perform energy detection according to the above-described technical solution of the present disclosure and determine whether to use the unlicensed frequency band and use which unlicensed frequency band based on a detection report from the UE3.

According to a preferred embodiment of the present disclosure, the processing circuit 110 may determine whether to transmit using the second cell operating in the unlicensed frequency band in response to an energy detection report from the UE. In a preferred embodiment, the processing circuit 110 may determine whether to perform downlink transmission using the second cell operating in the unlicensed frequency band in response to an energy detection report from the UE.

Figure 7:
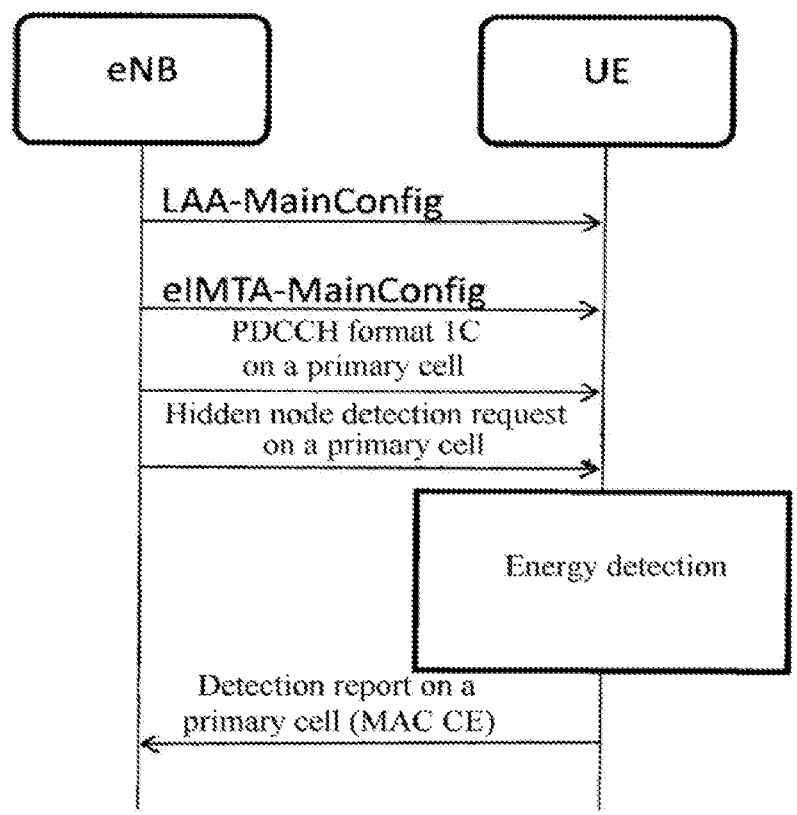
FIG. 7 is a timing diagram showing applying a fast adjustment method for an energy detection threshold according to an embodiment of the present disclosure in a hidden node scenario.

FIG. 7 shows a timing diagram of applying a fast adjustment method for an energy detection threshold according to an embodiment of the present disclosure in a hidden node scenario.

In FIG. 7, similar to the flow shown in FIG. 5, first, the eNB configures LAA-MainConfig signaling supporting the LAA by the RRC.

Next, the eNB configures eIMTA-MainConfig signaling supporting the eIMTA by the RRC.

Next, the eNB transmits a PDCCH format 1C in the Pcell to notify the UE of the energy detection threshold information.

Next, the eNB transmits a hidden node detection request in the Pcell. Upon receiving the hidden node detection request, the UE performs energy detection based on an energy detection threshold carried by the PDCCH format 1C.

Next, the UE reports a detection report in the Pcell to the eNB.

Figure 8:
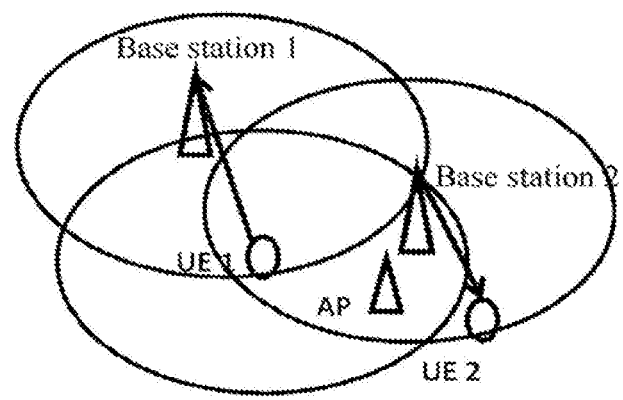
FIG. 8 is a schematic diagram showing an access point scenario in which an adjustment method for an energy detection threshold according to an embodiment of the present disclosure may be applied.

FIG. 8 is a schematic diagram showing an access point scenario in which an adjustment method for an energy detection threshold according to an embodiment of the present disclosure may be applied. As shown in FIG. 8, the base station 1 may transmit the energy detection threshold information to the UE1, and the UE1 performs energy detection based on the received energy detection threshold information. If the user equipment detects that a received interference level is greater than an energy detection threshold, it is determined that the user equipment suffers from interference from the LAA system. However, as shown in FIG. 8, an access point AP of a WiFi system is arranged around the UE1, and it is not determined whether the UE1 suffers from interference from the AP of the WiFi system.

For the above scenario, according to a preferred embodiment of the present disclosure, the processing circuit 110 may cause the communicating unit 120 to transmit a first energy detection threshold to the user equipment, and the user equipment performs energy detection based on the first energy detection threshold. In the case where the user equipment detects that the received interference level is greater than the first energy detection threshold, it is determined that the user equipment suffers from the interference from the LAA system but it is not determined whether the user equipment also suffers from the interference from the WiFi system. The user equipment reports an energy detection report to the base station side. After the report is received on the base station side, the processing circuit 110 may cause the communicating unit 120 to transmit a second energy detection threshold less than the first energy detection threshold to the user equipment and may at least set power of an LAA transmission controlled by the processing circuit to be zero. According to a preferred example of the present disclosure, the processing circuit 110 may also reduce or reset power of an LAA transmission of an adjacent cell by negotiating with the adjacent base station through X2 signaling. Next, the user equipment performs energy detection again based on the second energy detection threshold. In the case where the user equipment detects that a received interference level is greater than the second energy detection threshold, it is determined that the user equipment suffers from interference from the WiFi system due to the absence of the interference from the LAA system, and in the case where the user equipment detects that the received interference level is less than the second energy detection threshold, it is determined that there is no interference from the WiFi system. Next, the user equipment may report an energy detection report to the base station side.

In a preferred embodiment, the processing circuit 110 may adjust the energy detection threshold information in response to an energy detection report from the user equipment, and the communicating unit 120 may notify the user equipment of the adjusted energy detection threshold information. Preferably, the processing circuit 110 adjusts the energy detection threshold to be greater than the second energy detection threshold and less than the first energy detection threshold.

In a preferred embodiment, the network side may determine a source of the interference for example with the two-step configuration method for the energy detection threshold described above. If the interference on the user equipment mainly comes from the LAA system, the processing circuit 110 selects a higher energy detection threshold among the first energy detection threshold and the second energy detection threshold when adjusting the energy detection threshold, to increase a probability that the UE accesses into the frequency band. In another preferred embodiment, it is determined by the network side that a hidden node may be arranged around the user equipment, and the processing circuit 110 may select a lower energy detection threshold among the first energy detection threshold and the second energy detection threshold when adjusting the energy detection threshold, to reduce the probability that the UE accesses into the frequency band, thereby reducing the interference of the UE onto the hidden node around the user equipment.

In a preferred embodiment, the processing circuit 110 may transmit the first energy detection threshold and the second energy detection threshold by reusing the DCI information, or may transmit one of the first energy detection threshold and the second energy detection threshold by reusing the DCI information and transmit the other of the first energy detection threshold and the second energy detection threshold through high-layer signaling. In a preferred embodiment, the processing circuit 110 may transmit the adjusted energy detection threshold by reusing the DCI format 1C, or may transmit the adjusted energy detection threshold by reusing the DL grant or the DCI format 3/3A.

Figure 9:
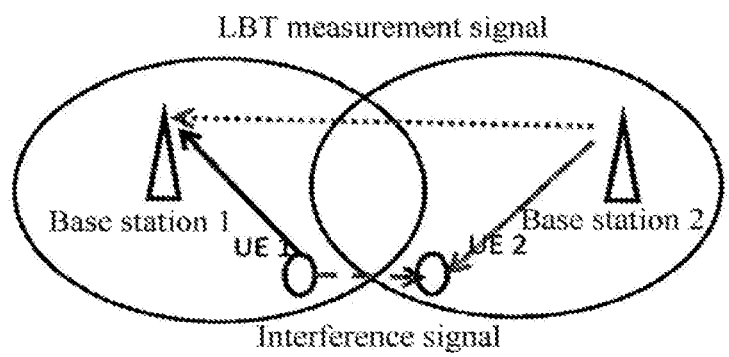
FIG. 9 is a schematic diagram showing adjusting an energy detection threshold on a base station side using an adjustment method for an energy detection threshold according to an embodiment of the present disclosure.

FIG. 9 is a schematic diagram showing adjusting an energy detection threshold on a base station side with an adjustment method for an energy detection threshold according to an embodiment of the present disclosure. As shown in FIG. 9, a UE1 is arranged within the coverage of a base station 1, a UE2 is arranged within the coverage of a base station 2, and the base station 1 and the base station 2 may belong to different operators. The base station 1 performs energy detection based on an energy detection threshold on the base station side, and UE2 arranged within the coverage of the base station 2 cannot be detected by the base station 1, and UE2 may suffer from interference when UE1 performs uplink transmission via physical uplink shared channel (PUSCH).

For the above scenario, in a preferred embodiment, the processing circuit 110 may adjust energy detection threshold information for downlink transmission on the base station side in response to an energy detection report from the user equipment. For example, the processing circuit 110 may reduce the energy detection threshold for downlink transmission on the base station side, that is, the processing circuit 110 reduces a threshold used by the base station for performing energy detection, to find a possible hidden node such as the UE2 around the user equipment.

According to an embodiment of the present disclosure, the processing circuit 110 may determine whether to schedule the user equipment in the cell to perform uplink transmission in response to an energy detection report from the user equipment. For example, in the case where the base station finds a hidden node such as the UE2 around the UE1, the base station may monitor an operating state of the hidden node. In a preferred embodiment, in a case where the base station monitors that the hidden node does not occupy a frequency band into which the UE1 is to access, it is allowed to schedule the UE1 to perform uplink transmission in the frequency band. In another preferred embodiment, in a case where the base station monitors that the hidden node occupies the frequency band to which UE1 is to access, it is not allowed to schedule the UE1 to perform uplink transmission in the frequency band.

Figure 10:
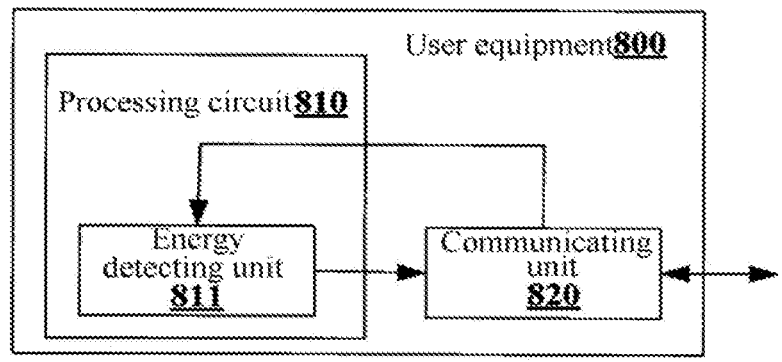
FIG. 10 is a block diagram showing a structure of a user equipment in a wireless communication system according to an embodiment of the present disclosure.

Next, a user equipment in a wireless communication system is described in detail. FIG. 10 shows a structure of a user equipment 800 in a wireless communication system according to an embodiment of the present disclosure. Similarly, the wireless communication system includes at least one first cell and one or more second cells, and at least one of the second cells operates in an unlicensed frequency band.

As shown in FIG. 10, the user equipment 800 may include a processing circuit 810. It should be noted that the user equipment 800 may include one processing circuit 810 or multiple processing circuits 810. The user equipment 800 may further include a communicating unit 820 such as a transceiver.

As described above, similarly, the processing circuit 810 may include various discrete functional units to perform various different functions and/or operations. The functional units may be physical entities or logical entities, and units referred to as different names may be implemented as a same physical entity.

For example, as shown in FIG. 10, the processing circuit 810 may include an energy detecting unit 811.

The communicating unit 820 may receive configuration information on at least one second cell operating in the unlicensed frequency band for carrier aggregation and receive energy detection threshold information for each of the second cell operating in the unlicensed frequency band.

Further, the energy detecting unit 811 may perform energy detection on the unlicensed frequency band based on the energy detection threshold information.

Preferably, the processing circuit 810 may decode the DCI format 1C received by the communicating unit 820 to extract the energy detection threshold information.

Preferably, the processing circuit 810 may decode the MAC signaling received by the communicating unit 820 to extract the energy detection threshold information.

Preferably, the processing circuit 810 may decode the RRC signaling received by the communicating unit 820 to extract the energy detection threshold information.

According to a preferred embodiment of the present disclosure, the user equipment 800 may further include a memory (not shown). The energy detection threshold information may include an energy detection threshold indication for the second cell operating in the unlicensed frequency band. The processing circuit 810 may decode the RRC signaling received in advance by the communicating unit 820 to extract multiple candidate energy detection thresholds and may store the multiple candidate energy detection thresholds in the memory.

Preferably, the communicating unit 820 may further receive uplink transmission grant information on the second cell operating in the unlicensed frequency band and may perform uplink transmission in a case where an energy detection result for the second cell operating in the unlicensed frequency band indicates that the unlicensed frequency band is idle.

Preferably, the communicating unit 820 may transmit the energy detection result from the processing circuit 810 to a base station serving the user equipment 800 in the wireless communication system.

Preferably, the processing circuit 810 may further include one or more timers. The communicating unit 820 may transmit the energy detection result from the processing circuit 810 to the base station serving the user equipment 800 in the wireless communication system after the one or more timers overflow. One or more of the timers may be a MAC timer herein.

Preferably, the processing circuit 810 may further include one or more counters for counting the number of failed energy detection results, and the energy detection result may include a count of the counter.

Preferably, the communicating unit 820 may further be configured to receive high-layer signaling including configuration information on an energy detection report for the user equipment 800, and the configuration information on the energy detection report may include a report parameter related to at least one of a periodic energy detection report and a non-periodic energy detection report.

Preferably, the configuration information on the energy detection report includes a period of the periodic energy detection report and/or a triggering condition for the non-periodic energy detection report.

Preferably, the period of the periodic energy detection report and/or the triggering condition for the non-periodic energy detection report includes timing threshold configurations of the one or more timers, and may include one or more counting threshold configurations of the counters. In addition, the period of the periodic energy detection report and/or the triggering condition for the non-periodic energy detection report may further include one or more threshold configurations related on a failure rate of energy detection.

Therefore, the user equipment 800 may report an energy detection report periodically and/or non-periodically based on the received configuration information. Processes that the user equipment 800 reports the energy detection report periodically and non-periodically are described below with reference to FIG. 11 and FIG. 12, respectively.

Figure 11:
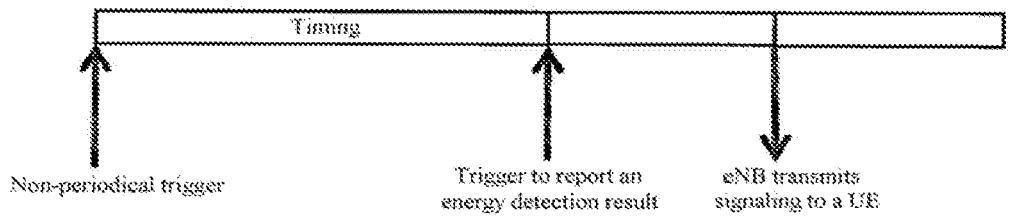
FIG. 11 is a schematic diagram showing that a user equipment in a wireless communication system according to an embodiment of the present disclosure reports an energy detection report non-periodically.

FIG. 11 is a schematic diagram showing that a user equipment in a wireless communication system according to an embodiment of the present disclosure reports an energy detection report non-periodically. The processing circuit 810 of the user equipment 800 may further include a first timer and a first counter. The first timer is provided with a first timing threshold, and the first counter is configured to count the number of failed energy detection results for a given energy detection threshold. As shown in FIG. 11, when a condition for non-periodically triggering to report an energy detection result is met, the first timer is started, and when the first timer overflows, i.e., the first timers reaches the first timing threshold, the non-periodic energy detection result is triggered to be reported. The energy detection result may include a count of the first counter. The condition for non-periodically triggering to report the energy detection result herein may be that a count of the first counter exceeds the first counting threshold, for example, the number of the failed energy detection results for the given energy detection threshold (e.g., −87 dBm) exceeds 5, the first timer is started. When the first timer overflows, the energy detection result is reported, for example, the number of failed energy detection is 10.

In the embodiment of reporting the energy detection result non-periodically, the first timer is reset and the first counter is cleared in a case that one of the following conditions is met: a) the user equipment 800 receives a new energy detection threshold before the first timer overflows; b) the number of the failed energy detection results does not reach a predetermined number in an interval for reporting the energy detection result; and c) the energy detection result is reported. As described above, the base station may transmit signaling to the user equipment 800 after receiving the energy detection report. The energy detection result may be reported via the MAC signaling, and the signaling transmitted from the base station to the user equipment 800 may be the physical-layer signaling and the high-layer signaling.

Figure 12:
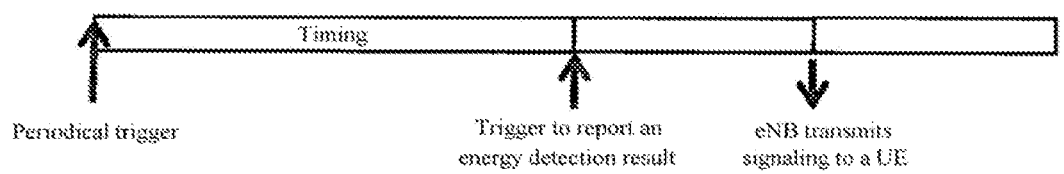
FIG. 12 is a schematic diagram showing that a user equipment in a wireless communication system according to an embodiment of the present disclosure reports an energy detection report periodically.

FIG. 12 is a schematic diagram showing that the user equipment 800 in the wireless communication system according to an embodiment of the present disclosure reports an energy detection report periodically. The processing circuit 810 of the user equipment 800 may further include a second timer and a second counter. The second timer is provided with a second timing threshold and overflows periodically, and the second counter is configured to count the number of failed energy detection results for a given energy detection threshold. As shown in FIG. 12, when the second timer overflows, i.e., the second timer reaches the second timing threshold, the energy detection result is triggered to be reported. The energy detection result may include a count of the second counter. When the energy detection result is reported, the second counter is cleared and the second timer is reset. As described above, the base station may transmit signaling to the user equipment 800 after receiving the energy detection report. The energy detection result may be reported via the MAC signaling, and the signaling transmitted from the base station to the user equipment 800 may be the physical-layer signaling and the high-layer signaling.

According to a preferred embodiment of the present disclosure, the period of the periodic energy detection report and/or the triggering condition for the non-periodic energy detection report may further include one or more threshold configurations related on a failure rate of energy detection. As described above, the one or more counters in the user equipment 800 may count the number of failed energy detection results, and a failure rate of energy detection may be calculated, i.e., a ratio of the number of the failed energy detection results to the total number of energy detection. The energy detection result may include the failure rate of energy detection, and the condition for non-periodically triggering to report the energy detection result may be that the failure rate of energy detection exceeds a failure rate threshold of energy detection.

According to a preferred embodiment of the present disclosure, multiple different thresholds may be set for the failure rate of energy detection, and the condition for non-periodically triggering to report the energy detection result may be that the failure rate of energy detection exceeds one of the multiple failure rate thresholds of energy detection. Similarly, each counting threshold and each failure rate threshold of energy detection may also correspond to multiple timers. In case where the user equipment 800 reports the energy detection result, a report ID may be added to the energy detection report to distinguish the events (e.g., the failure rate threshold of energy detection and the timer) to be reported. The report ID herein may be, for example, a logical channel identifier (LCID) of the MAC control unit.

According to a preferred embodiment of the present disclosure, upon receiving the energy detection report transmitted from the user equipment 800, the base station may be configured to perform one or more of the following operations: determining that a hidden node exists around the user equipment 800 if the failure rate of energy detection is high, for example, greater than 90%; increasing the energy detection threshold of the user equipment 800 if the failure rate of energy detection is moderate and the user equipment 800 has a large demand for uplink traffic, to increase the probability that the user equipment 800 accesses into the frequency band; allocating more resources to a frequency band with less number of failed energy detection when controlling uplink power.

The electronic device (user equipment) in a wireless communication system according to an embodiment of the present disclosure has been described above. A base station in a wireless communication system according to another embodiment of the present disclosure is further described below with reference to FIG. 13, which shows a structure of a base station 900 in a wireless communication system according to another embodiment of the present disclosure.

The base station 900 may manage a first cell operating in a licensed frequency band and a second cell operating in an unlicensed frequency band.

Figure 13:
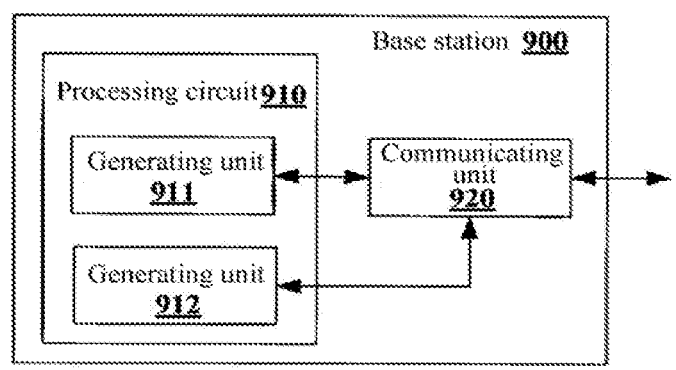
FIG. 13 is a block diagram showing a structure of a base station in a wireless communication system according to an embodiment of the present disclosure.

As shown in FIG. 13, the base station 900 may include a processing circuit 910. It should be noted that the base station 900 may include one processing circuit 910 or multiple processing circuits 910. The base station 900 may further include a communicating unit 920 such as a transceiver.

As described above, similarly, the processing circuit 910 may include various discrete functional units to perform various different functions and/or operations. The functional units may be physical entities or logical entities, and units referred to as different names may be implemented as a same physical entity.

For example, as shown in FIG. 13, the processing circuit 910 may include generating units 911 and 912.

The generating unit 911 may generate multiple energy detection thresholds based on a network status, and contain the multiple energy detection thresholds into first signaling. The first signaling herein may be high-layer signaling such as the RRC.

The network status herein may be one or more of the following parameters: an antenna gain and the number of transmission antennas; coexistence with the LAA system in the absence of other wireless access technology (including Wi-Fi); a maximum effective isotropic radiated power (EIRP) of a transmission point of the LAA system in the unlicensed frequency band; a maximum EIRP within transmission burst after the listen before talk (LBT) program; a transmission bandwidth; measured background noise of an environment; a topological scenario (indoor or outdoor); estimated load in an operating channel; and the feasibility of a coexistence test.

The generating unit 912 may generate an energy detection threshold indication for indicating one of the multiple energy detection thresholds for the second cell. The UE performs energy detection on the unlicensed frequency band corresponding to the second cell based on the energy detection threshold indication. The generating unit 912 may further contain the energy detection threshold indication into second signaling. The second signaling herein may be, for example, a physical-layer signaling (a DCI in the PDCCH) or a MAC-layer signaling.

It should be noted that a transmission interval of the first signaling is longer than a transmission interval of the second signaling.

With the base station 900 as shown in FIG. 13, the multiple energy detection thresholds æ°È#, ˇ transmitted through the first signaling having a longer transmission interval, and the energy detection threshold indication for indicating one of the multiple energy detection thresholds may be transmitted through the second signaling having a shorter transmission interval, thereby reducing transmission resource overhead, adapting to a change in an operating state of a specific system with a higher flexibility. In this way, multiple systems are coordinated to use a same unlicensed frequency band, thereby optimizing use for an unlicensed spectrum, and the systems have equal rights to use the unlicensed frequency band.

Corresponding to the base station 900 shown in FIG. 13, a user equipment in a wireless communication system is provided according to another embodiment of the present disclosure. Similarly, the wireless communication system includes one first cell and one or more second cells, and at least one of the second cells operates in an unlicensed frequency band.

Similarly, the user equipment may include a processing circuit. It should be noted that the user equipment may include one processing circuit or multiple processing circuits. The user equipment may further include a communicating unit such as a transceiver.

As described above, similarly, the processing circuit may include various discrete functional units to perform various different functions and/or operations. The functional units may be physical entities or logical entities, and units referred to as different names may be implemented as a same physical entity.

For example, the processing circuit may include an energy detecting unit.

The processing circuit may cause the communicating unit to receive, from a base station serving the user equipment, first signaling including multiple energy detection thresholds.

Further, the processing circuit may cause the communicating unit to receive, from the base station, second signaling including an energy detection threshold indication for indicating one of the multiple energy detection thresholds.

Further, the energy detecting unit in the processing circuit may perform energy detection on the unlicensed frequency band based on the energy detection threshold indication.

It should also be noted that a transmission interval of the first signaling is longer than a transmission interval of the second signaling.

Next, a wireless communication method in a wireless communication system according to an embodiment of the present disclosure is described. Similarly, the wireless communication system includes at least one first cell and one or more second cells, and at least one of the second cells operates in an unlicensed frequency band. The method may include: configuring the at least one second cell operating in the unlicensed frequency band for a user equipment, for carrier aggregation communication; and generating dynamically or semi-statically energy detection threshold information for each of the second cell operating in the unlicensed frequency band so that the user equipment performs energy detection on the unlicensed frequency band based on the energy detection threshold information.

Preferably, the method may further include: containing the energy detection threshold information into a DCI format 1C by reusing a DCI format 1C, and notifying the user equipment.

Preferably, the method may further include: reusing a bit in the DCI format 1C for indicating an uplink and downlink configuration of the second cell as a bit for an energy detection threshold indication used when energy detection is performed for the at least one second cell operating in the unlicensed frequency band.

Preferably, the method may further include: containing the energy detection threshold information into MAC signaling and notifying the user equipment.

Preferably, the method may further include: containing the energy detection threshold information into RRC signaling and notifying the user equipment.

Preferably, the energy detection threshold information may include an energy detection threshold indication for the second cell operating in the unlicensed frequency band, and the method may further include: before generating the energy detection threshold information, containing multiple candidate energy detection thresholds into dedicated signaling and notifying the user equipment.

Preferably, the method may further include generating the energy detection threshold information based on traffic load and/or a channel idle probability of the unlicensed frequency band.

Preferably, the method may further include generating the energy detection threshold information based on energy detection threshold indication information received from other electronic device.

Preferably, the method may further include generating high-layer signaling including configuration information on an energy detection report for the user equipment, where the configuration information on the energy detection report includes a report parameter related to at least one of a periodic energy detection report and a non-periodic energy detection report.

Preferably, the configuration information on the energy detection report includes a period of the periodic energy detection report and/or a triggering condition for the non-periodic energy detection report.

Preferably, the period of the periodic energy detection report and/or the triggering condition for the non-periodic energy detection report includes timing threshold configurations of one or more timers.

Preferably, the triggering condition for the non-periodic energy detection report includes one or more counting threshold configurations related to failed energy detection.

Preferably, the method may further include: determining, in response to an energy detection report from the user equipment, whether to transmit using the second cell operating in the unlicensed frequency band.

Preferably, the method may further include adjusting the energy detection threshold information in response to an energy detection report from the user equipment, and notifying the user equipment of the adjusted energy detection threshold information.

Preferably, the method may further include: adjusting energy detection threshold information on an electronic device side for downlink transmission in response to an energy detection report from the user equipment.

Preferably, the first cell operates in a licensed frequency band and the energy detection threshold information may be transmitted via the first cell.

In another aspect, a wireless communication method in a wireless communication system according to another embodiment of the present disclosure may include: receiving configuration information on at least one second cell operating in an unlicensed frequency band for carrier aggregation; receiving energy detection threshold information for each of the second cell operating in the unlicensed frequency band; and performing energy detection on the unlicensed frequency band based on the energy detection threshold information. Similarly, the wireless communication system includes at least one first cell and one or more second cells, and at least one of the one or more second cells operates in the unlicensed frequency band.

Preferably, the method may further include decoding received DCI format 1C to extract the energy detection threshold information.

Preferably, the method may further include decoding received MAC signaling to extract the energy detection threshold information.

Preferably, the method may further include decoding received RRC signaling to extract the energy detection threshold information.

Preferably, the energy detection threshold information may include an energy detection threshold indication for the second cell operating in the unlicensed frequency band, and the method may further include decoding the RRC signaling in advance received to extract multiple candidate energy detection thresholds, and storing the multiple candidate energy detection thresholds in a memory included in the user equipment.

Preferably, the method may further include: receiving uplink transmission grant information on the second cell operating in the unlicensed frequency band; and performing uplink transmission in a case where an energy detection result for the second cell operating in the unlicensed frequency band indicates that the unlicensed frequency band is idle.

Preferably, the method may further include transmitting the energy detection result to a base station serving the user equipment in the wireless communication system.

Preferably, the transmitting the energy detection result to the base station serving the user equipment in the wireless communication system may include: transmitting the energy detection result to the base station serving the user equipment in the wireless communication system after one or more timers overflow.

Preferably, the transmitting the energy detection result to the base station serving the user equipment in the wireless communication system may include counting the number of failed energy detection results, where the energy detection result includes a count of the counter.

Preferably, the method may further include: receiving high-layer signaling containing configuration information on an energy detection report for the user equipment, where the configuration information on the energy detection report includes a report parameter related to at least one of a periodic energy detection report and a non-periodic energy detection report.

Preferably, the configuration information on the energy detection report includes a period of the periodic energy detection report and/or a triggering condition for the non-periodic energy detection report.

Preferably, the period of the periodic energy detection report and/or the triggering condition for the non-periodic energy detection report includes timing threshold configurations of one or more timers.

Preferably, the triggering condition for the non-periodic energy detection report includes one or more counting threshold configurations of the counters.

On the other hand, a wireless communication method in a wireless communication system according to another embodiment of the present disclosure may include: generating multiple energy detection thresholds based on a network status, and containing the multiple energy detection thresholds into first signaling; and generating, for a second cell, an energy detection threshold indication for indicating one of the multiple energy detection thresholds so that a user equipment performs energy detection on an unlicensed frequency band corresponding to the second cell based on the energy detection threshold indication, and containing the energy detection threshold indication in second signaling, and where a transmission interval of the first signaling is longer than a transmission interval of the second signaling long. A base station in the wireless communication system manages a first cell operating in a licensed frequency band and the second cell operating in the unlicensed frequency band.

On the other hand, a wireless communication method in a wireless communication system according to another embodiment of the present disclosure may include: receiving, from a base station serving a user equipment, a first signaling including multiple energy detection thresholds; receiving, from the base station, second signaling including an energy detection threshold indication for indicating one of the multiple energy detection thresholds; and performing energy detection on the unlicensed frequency band based on the energy detection threshold indication, where a transmission interval of the first signaling is longer than a transmission interval of the second signaling. The wireless communication system includes one first cell and one or more second cells, and at least one of the one or more second cells operates in the unlicensed frequency band.

Various embodiments of the above-described steps of a wireless communication method in a wireless communication system according to an embodiment of the present disclosure have been described in detail, which are not repeated herein.

The technology according to the present disclosure can be applied to various types of products. For example, the base station mentioned in the present disclosure may be implemented as any type of evolution Node B (eNB), such as a macro eNB and a small eNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The base station may include: a main body (also referred to as a base station apparatus) configured to control wireless communication; and one or more remote radio heads (RRH) arranged at positions different from the main body. In addition, various types of terminals described below may operate as a base station by performing functions of the base station temporarily or in a semi-persistent manner.

For example, the UE mentioned in the present disclosure may be implemented as a mobile terminal (such as a smartphone, a tablet personal computer (PC), a notebook PC, a portable game terminal, a portable/dongle mobile router and a digital camera device) or an in-vehicle terminal (such as a car navigation apparatus). The UE may also be implemented as a terminal (also referred to as a machine-type communication (MTC) terminal) performing machine to machine (M2M) communication. In addition, the UE may be a wireless communication module (such as an integrated circuit module including a single chip) installed on each of the above terminals.

Figure 14:
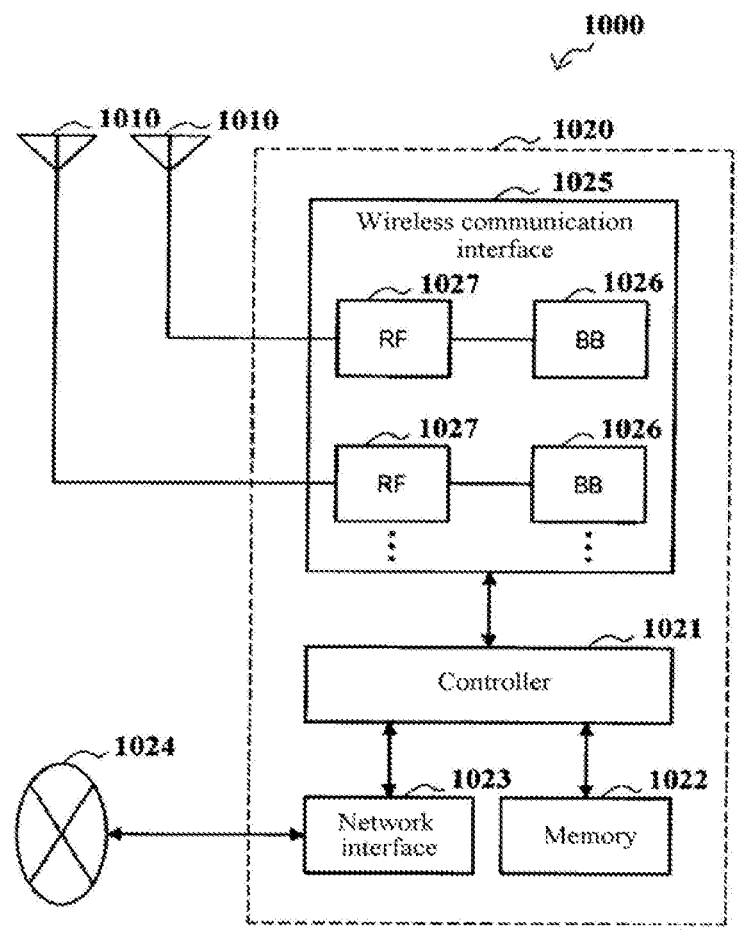
FIG. 14 is a block diagram showing a first schematic configuration example of an evolution node base station (eNB) to which the present disclosure may be applied.

FIG. 14 is a block diagram showing a first schematic configuration example of an eNB to which the technology of the present disclosure may be applied. An eNB 100 includes one or more antennas 1010 and a base station apparatus 1020. Each antenna 1010 and the base station apparatus 1020 may be connected to each other via an RF cable.

Each of the antennas 1010 includes a single or multiple antenna elements (such as multiple antenna elements included in an MIMO antenna), and is used for the base station apparatus 1020 to transmit and receive radio signals. As shown in FIG. 14, the eNB 1000 may include the multiple antennas 1010. For example, the multiple antennas 1010 may be compatible with multiple frequency bands used by the eNB 1000. Although FIG. 14 shows the example in which the eNB 1000 includes the multiple antennas 1010, the eNB 1000 may also include a single antenna 1010.

The base station apparatus 1020 includes a controller 1021, a memory 1022, a network interface 1023, and a wireless communication interface 1025.

The controller 1021 may be, for example, a CPU or a DSP, and operates various functions of a higher layer of the base station apparatus 1020. For example, the controller 1021 generates a data packet from data in signals processed by the wireless communication interface 1025, and transfers the generated packet via the network interface 1023. The controller 1021 may bundle data from multiple base band processors to generate the bundled packet, and transfer the generated bundled packet. The controller 1021 may have logical functions of performing control such as radio resource control, radio bearer control, mobility management, admission control and scheduling. The control may be performed in corporation with an eNB or a core network node in the vicinity. The memory 1022 includes a RAM and a ROM, and stores a program executed by the controller 1021, and various types of control data (such as a terminal list, transmission power data, and scheduling data).

The network interface 1023 is a communication interface for connecting the base station apparatus 1020 to a core network 1024. The controller 1021 may communicate with a core network node or another eNB via the network interface 1023. In that case, the eNB 1000, and the core network node or the other eNB may be connected to each other through a logical interface (such as an S1 interface and an X2 interface). The network interface 1023 may also be a wired communication interface or a wireless communication interface for wireless backhaul. If the network interface 1023 is a wireless communication interface, the network interface 1023 may use a higher frequency band for wireless communication than a frequency band used by the wireless communication interface 1025.

The wireless communication interface 1025 supports any cellular communication scheme (such as Long Term Evolution (LTE) and LTE-Advanced), and provides wireless connection to a terminal positioned in a cell of the eNB 1000 via the antenna 1010. The wireless communication interface 1025 may typically include, for example, a baseband (BB) processor 1026 and an RF circuit 1027. The BB processor 1026 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 1026 may have a part or all of the above-described logical functions instead of the controller 1021. The BB processor 1026 may be a memory that stores a communication control program, or a module that includes a processor and a related circuit configured to execute the program. Updating the program may allow the functions of the BB processor 1026 to be changed. The module may be a card or a blade that is inserted into a slot of the base station apparatus 1020. Alternatively, the module may also be a chip that is mounted on the card or the blade. Meanwhile, the RF circuit 1027 may include, for example, a mixer, a filter, and an amplifier, and transmits and receives wireless signals via the antenna 1010.

As shown in FIG. 14, the wireless communication interface 1025 may include the multiple BB processors 1026. For example, the multiple BB processors 1026 may be compatible with multiple frequency bands used by the eNB 1000. As shown in FIG. 14, the wireless communication interface 1025 may include the multiple RF circuits 1027. For example, the multiple RF circuits 1027 may be compatible with multiple antenna elements. Although FIG. 14 shows the example in which the wireless communication interface 1025 includes the multiple BB processors 1026 and the multiple RF circuits 1027, the wireless communication interface 1025 may also include a single BB processor 1026 or a single RF circuit 1027.

Figure 15:
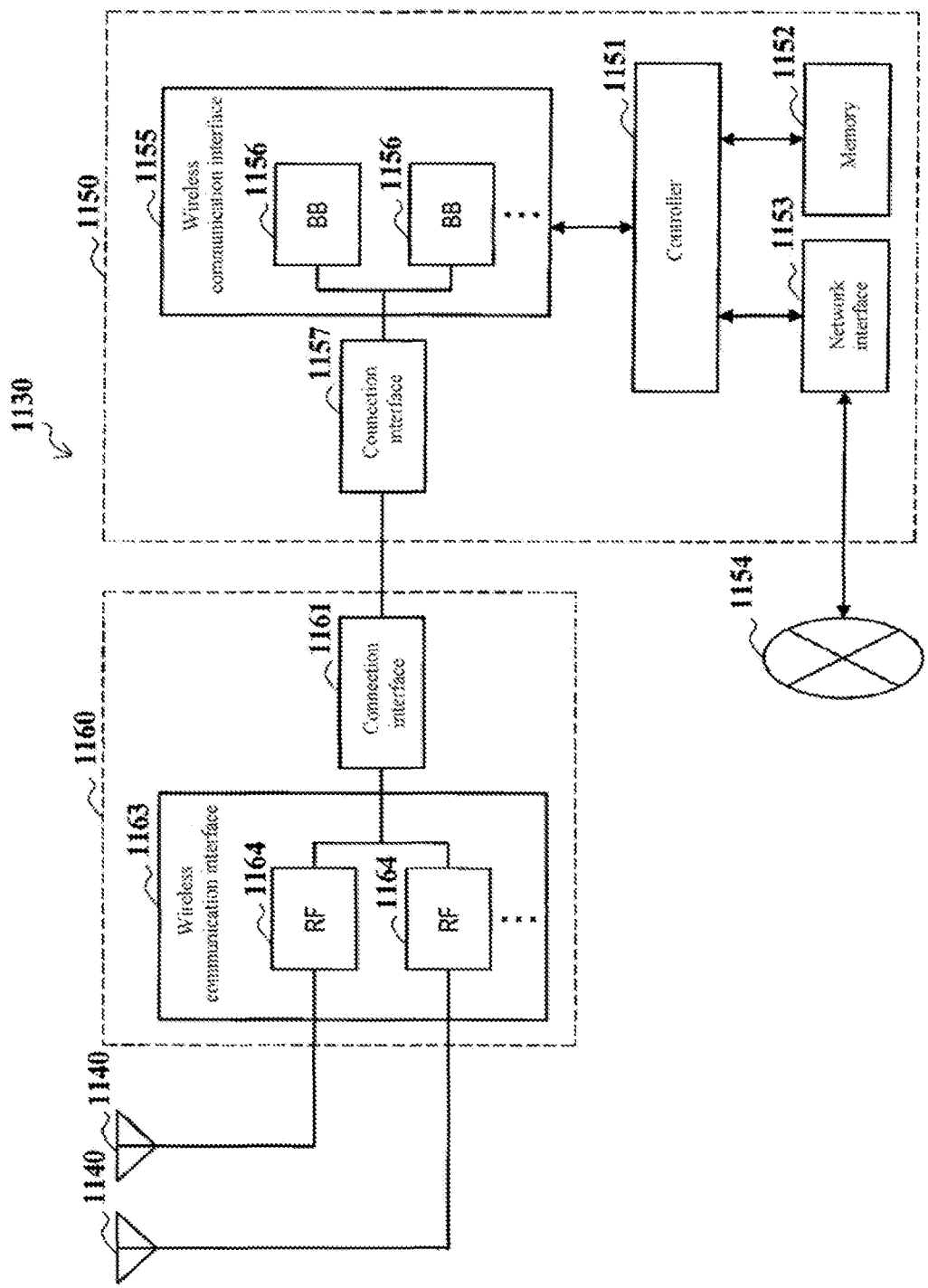
FIG. 15 is a block diagram showing a second schematic configuration example of an eNB to which the present disclosure may be applied.

FIG. 15 is a block diagram showing a second schematic configuration example of an eNB to which the technology of the present disclosure may be applied. An eNB 1130 includes one or more antennas 1140, a base station apparatus 1150, and an RRH 1160. Each antenna 1140 and the RRH 1160 may be connected to each other via an RF cable. The base station apparatus 1150 and the RRH 1160 may be connected to each other via a high speed line such as an optical fiber cable.

Each of the antennas 1140 includes a single or multiple antenna elements (such as multiple antenna elements included in an MIMO antenna), and is used for the RRH 1160 to transmit and receive radio signals. As shown in FIG. 15, the eNB 1130 may include the multiple antennas 1140. For example, the multiple antennas 1140 may be compatible with multiple frequency bands used by the eNB 1130. Although FIG. 15 shows the example in which the eNB 1130 includes the multiple antennas 1140, the eNB 1130 may also include a single antenna 1140.

The base station apparatus 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 14.

The wireless communication interface 1155 supports any cellular communication scheme (such as LTE and LTE-Advanced), and provides wireless communication to a terminal positioned in a sector corresponding to the RRH 1160 via the RRH 1160 and the antenna 1140. The wireless communication interface 1155 may typically include, for example, a BB processor 1156. The BB processor 1156 is the same as the BB processor 1026 described with reference to FIG. 14, except the BB processor 1156 is connected to the RF circuit 1164 of the RRH 1160 via the connection interface 1157. As shown in FIG. 15, the wireless communication interface 1155 may include the multiple BB processors 1156. For example, the multiple BB processors 1156 may be compatible with multiple frequency bands used by the eNB 1130. Although FIG. 15 shows the example in which the wireless communication interface 1155 includes the multiple BB processors 1156, the wireless communication interface 1155 may also include a single BB processor 1156.

The connection interface 1157 is an interface for connecting the base station apparatus 1150 (wireless communication interface 1155) to the RRH 1160. The connection interface 1157 may also be a communication module for communication in the above-described high speed line that connects the base station apparatus 1150 (wireless communication interface 1155) to the RRH 1160.

The RRH 1160 includes a connection interface 1161 and a wireless communication interface 1163.

The connection interface 1161 is an interface for connecting the RRH 1160 (wireless communication interface 1163) to the base station apparatus 1150. The connection interface 1161 may also be a communication module for communication in the above-described high speed line.

The wireless communication interface 1163 transmits and receives wireless signals via the antenna 1140. The wireless communication interface 1163 may typically include, for example, the RF circuit 1164. The RF circuit 1164 may include, for example, a mixer, a filter, and an amplifier, and transmits and receives wireless signals via the antenna 1140. As shown in FIG. 15, the wireless communication interface 1163 may include multiple RF circuits 1164. For example, the multiple RF circuits 1164 may support multiple antenna elements. Although FIG. 15 shows the example in which the wireless communication interface 1163 includes the multiple RF circuits 1164, the wireless communication interface 1163 may also include a single RF circuit 1164.

In the eNB 1000 shown in FIG. 14 and eNB 1130 shown in FIG. 15, the processing circuit 110 described with reference to FIG. 1 and the configuring unit 111 and the generating unit 112 in the processing circuit 110, and the processing circuit 910 described with reference to FIG. 13 and the generating units 911 and 912 in the processing circuit 910 may be implemented by the controller 1021 and/or the controller 1151, and the communicating unit 120 described with reference to FIG. 1 and the communicating unit 920 described with reference to FIG. 13 may be implemented by the wireless communication interface 1025 and the wireless communication interface 1155 and/or the wireless communication interface 1163. At least a part of the functions may also be implemented by the controller 1021 and the controller 1151. For example, the controller 1021 and/or the controller 1151 may implement the functions of configuring a cell operating in an unlicensed frequency band and generating energy detection threshold information by executing instructions stored in memories.

Figure 16:
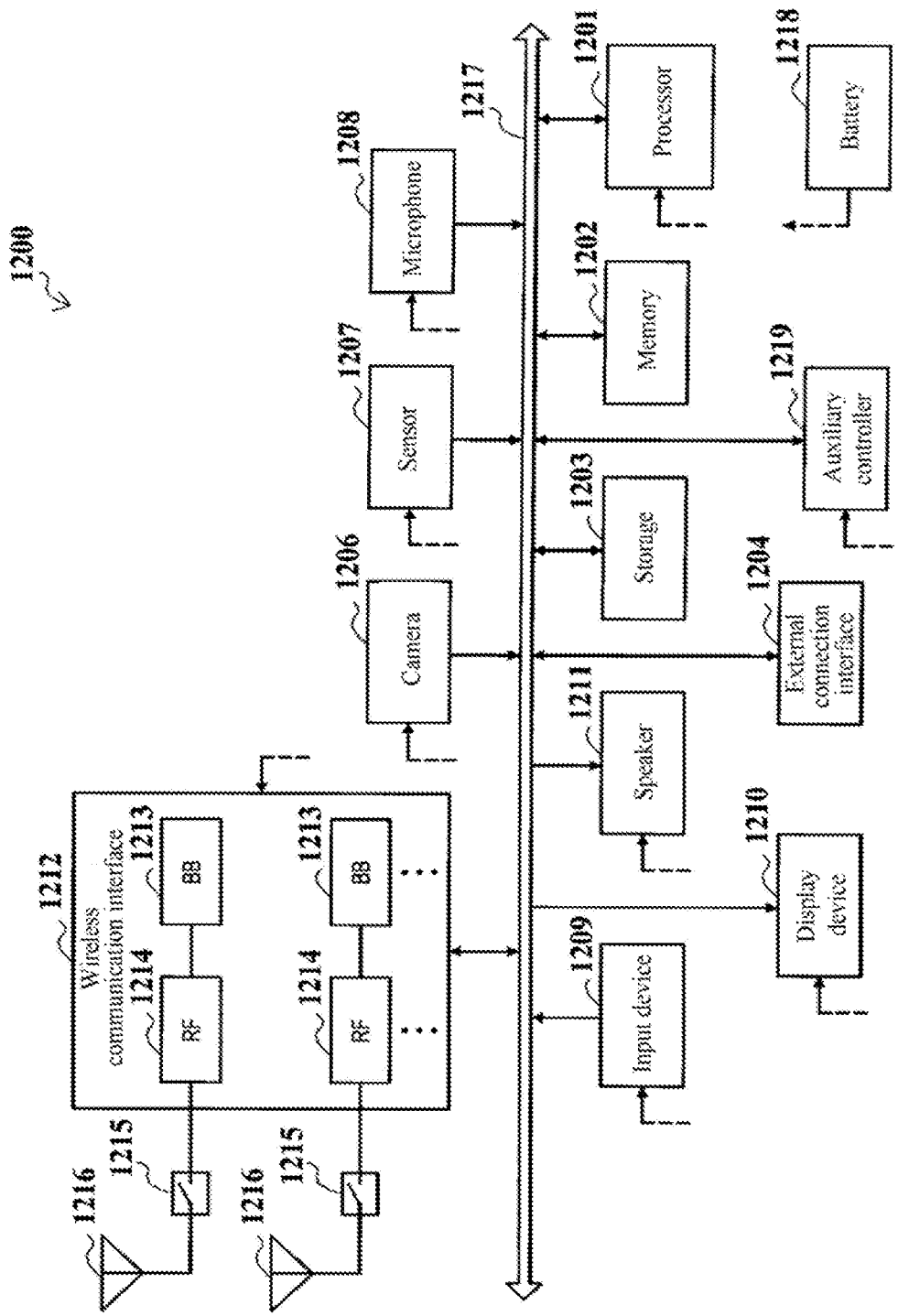
FIG. 16 is a block diagram showing a schematic configuration example of a smartphone to which the present disclosure may be applied.

FIG. 16 is a block diagram showing a schematic configuration example of a smartphone 1200 to which the technology of the present disclosure may be applied. The smartphone 1200 includes a processor 1201, a memory 1202, a storage 1203, an external connection interface 1204, a camera 1206, a sensor 1207, a microphone 1208, an input device 1209, a display device 1210, a speaker 1211, a wireless communication interface 1212, one or more antenna switches 1215, one or more antennas 1216, a bus 1217, a battery 1218, and an auxiliary controller 1219.

The processor 1201 may be, for example, a CPU or a system on a chip (SoC), and controls functions of an application layer and another layer of the smartphone 1200. The memory 1202 includes RAM and ROM, and stores a program that is executed by the processor 1201 and data. The storage 1203 may include a storage medium such as a semiconductor memory and a hard disk. The external connection interface 1204 is an interface for connecting an external device (such as a memory card and a universal serial bus (USB) device) to the smartphone 1200.

The camera 1206 includes an image sensor (such as a charge coupled device (CCD) and a complementary metal oxide semiconductor (CMOS)), and generates a captured image. The sensor 1207 may include a group of sensors such as a measurement sensor, a gyro sensor, a geomagnetic sensor and an acceleration sensor. The microphone 1208 converts sounds that are input to the smartphone 1200 to audio signals. The input device 1209 includes, for example, a touch sensor configured to detect touch onto a screen of the display device 1210, a keypad, a keyboard, a button or a switch, and receives an operation or an information input from a user. The display device 1210 includes a screen such as a liquid crystal display (LCD) and an organic lightemitting diode (OLED) display, and displays an output image of the smartphone 1200. The speaker 1211 converts audio signals outputted from the smartphone 1200 to sounds.

The wireless communication interface 1212 supports any cellular communication scheme such as LET and LTE-Advanced, and performs wireless communication. The wireless communication interface 1212 may typically include, for example, a BB processor 1213 and an RF circuit 1214. The BB processor 1213 may perform, for example, encoding/decoding, modulating/demodulating, and multiplexing/demultiplexing, and performs various types of signal processing for wireless communication. Meanwhile, the RF circuit 1214 may include, for example, a mixer, a filter and an amplifier, and transmits and receives wireless signals via the antenna 1216. The wireless communication interface 1212 may be a one chip module having the BB processor 1213 and the RF circuit 1214 integrated thereon. As shown in FIG. 16, the wireless communication interface 1212 may include the multiple BB processors 1213 and the multiple RF circuits 1214. Although FIG. 16 shows the example in which the wireless communication interface 1212 includes the multiple BB processors 1213 and the multiple RF circuits 1214, the wireless communication interface 1212 may also include a single BB processor 1213 or a single RF circuit 1214.

Furthermore, in addition to a cellular communication scheme, the wireless communication interface 1212 may support another type of wireless communication scheme such as a short-distance wireless communication scheme, a near field communication scheme, and a wireless local area network (LAN) scheme. In that case, the wireless communication interface 1212 may include the BB processor 1213 and the RF circuit 1214 for each wireless communication scheme.

Each of the antenna switches 1215 switches connection destinations of the antennas 1216 among multiple circuits (such as circuits for different wireless communication schemes) included in the wireless communication interface 1212.

Each of the antennas 1216 includes a single or multiple antenna elements (such as multiple antenna elements included in an MIMO antenna), and is used for the wireless communication interface 1212 to transmit and receive wireless signals. As shown in FIG. 16, the smartphone 1200 may include the multiple antennas 1216. Although FIG. 16 shows the example in which the smartphone 1200 includes the multiple antennas 1216, the smartphone 1200 may also include a single antenna 1216.

Furthermore, the smartphone 1200 may include the antenna 1216 for each wireless communication scheme. In that case, the antenna switches 1215 may be omitted from the configuration of the smartphone 1200.

The bus 1217 connects the processor 1201, the memory 1202, the storage 1203, the external connection interface 1204, the camera 1206, the sensor 1207, the microphone 1208, the input device 1209, the display device 1210, the speaker 1211, the wireless communication interface 1212, and the auxiliary controller 1219 to each other. The battery 1218 supplies power to blocks of the smartphone 1200 shown in FIG. 16 via feeder lines, which are partially shown as dashed lines in the FIG. 16. The auxiliary controller 1219 operates a minimum necessary function of the smartphone 1200, for example, in a sleep mode.

In the smartphone 1200 shown in FIG. 16, the processing circuit 810 described with reference to FIG. 10 and the energy detecting unit 811 thereof may be implemented by the processor 1201 or the auxiliary controller 1219, and the communicating unit 820 described with reference to FIG. 10 may be implemented by the wireless communication interface 1212. At least a part of the functions may also be implemented by the processor 1201 or the auxiliary controller 1219. For example, the processor 1201 or the auxiliary controller 1219 can implement the functions by executing instructions stored in the memory 1202 or the storage 1203.

Figure 17:
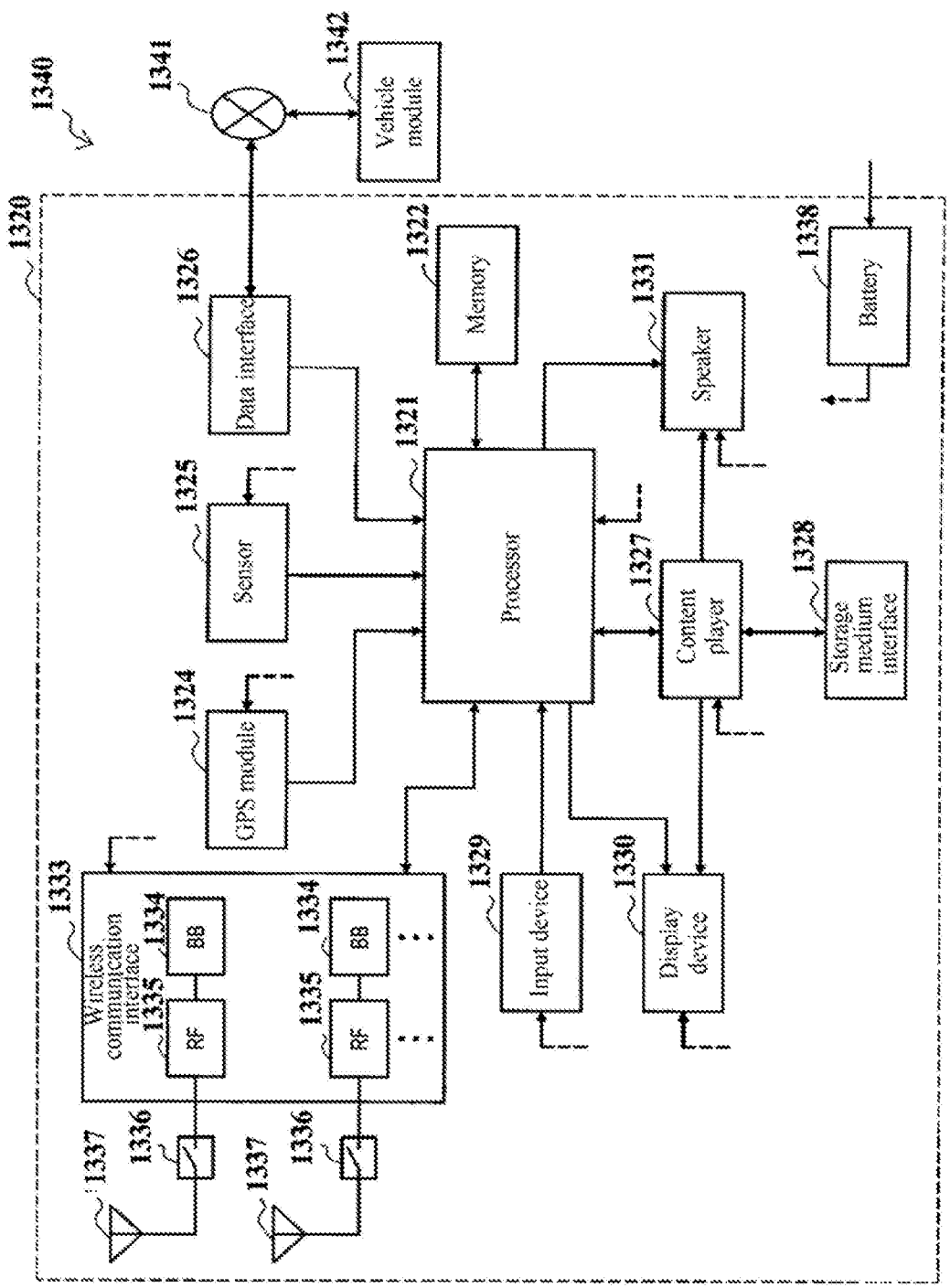
FIG. 17 is a block diagram showing a schematic configuration example of a car navigation apparatus to which the present disclosure may be applied.

FIG. 17 is a block diagram showing an example of a schematic configuration of a car navigation apparatus 1320 to which the technology of the present disclosure may be applied. The car navigation apparatus 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be, for example, a CPU or a SoC, and controls a navigation function and another function of the car navigation apparatus 1320. The memory 1322 includes a RAM and a ROM, and stores a program executed by the processor 1321, and data.

The GPS module 1324 uses GPS signals received from a GPS satellite to determine a position (such as latitude, longitude, and altitude) of the car navigation apparatus 1320. The sensor 1325 may include a group of sensors such as a gyro sensor, a geomagnetic sensor, and an air pressure sensor. The data interface 1326 is connected to, for example, an in-vehicle network 1341 via a terminal that is not shown, and acquires data (such as vehicle speed data) generated by the vehicle.

The content player 1327 reproduces content stored in a storage medium (such as a CD and a DVD) that is inserted into the storage medium interface 1328. The input device 1329 includes, for example, a touch sensor configured to detect touch onto a screen of the to display device 1330, a button or a switch, and receives an operation or an information inputted from a user. The display device 1330 includes a screen such as a LCD or an OLED display, and displays an image of the navigation function or content that is reproduced. The speaker 1331 outputs sounds of the navigation function or the content that is reproduced.

The wireless communication interface 1333 supports any cellular communication scheme (such as LTE and LTE-Advanced), and performs wireless communication. The wireless communication interface 1333 may typically include, for example, a BB processor 1334 and an RF circuit 1335. The BB processor 1334 may perform, for example, encoding/decoding, modulating/demodulating, and multiplexing/demultiplexing, and performs various types of signal processing for wireless communication. Meanwhile, the RF circuit 1335 may include, for example, a mixer, a filter, and an amplifier, and transmits and receives wireless signals via the antenna 1337. The wireless communication interface 1333 may also be a one chip module that has the BB processor 1334 and the RF circuit 1335 integrated thereon. As shown in FIG. 17, the wireless communication interface 1333 may include the multiple BB processors 1334 and the multiple RF circuits 1335. Although FIG. 17 shows the example in which the wireless communication interface 1333 includes the multiple BB processors 1334 and the multiple RF circuits 1335, the wireless communication interface 1333 may also include a single BB processor 1334 or a single RF circuit 1335.

Furthermore, in addition to the cellular communication scheme, the wireless communication interface 1333 may support another type of wireless communication scheme such as a short-distance wireless communication scheme, a near field communication scheme, and a wireless LAN scheme. In that case, the wireless communication interface 1333 may include the BB processor 1334 and the RF circuit 1335 for each wireless communication scheme.

Each of the antenna switches 1336 switches connection destinations of the antennas 1337 among multiple circuits (such as circuits for different wireless communication schemes) included in the wireless communication interface 1333.

Each of the antennas 1337 includes a single or multiple antenna elements (such as multiple antenna elements included in an MIMO antenna), and is used for the wireless communication interface 1333 to transmit and receive wireless signals. As shown in FIG. 17, the car navigation apparatus 1320 may include the multiple antennas 1337. Although FIG. 17 shows the example in which the car navigation apparatus 1320 includes the multiple antennas 1337, the car navigation apparatus 1320 may also include a single antenna 1337.

Furthermore, the car navigation apparatus 1320 may include the antenna 1337 for each wireless communication scheme. In that case, the antenna switches 1336 may be omitted from the configuration of the car navigation apparatus 1320.

The battery 1338 supplies power to blocks of the car navigation apparatus 1320 shown in FIG. 17 via feeder lines that are partially shown as dashed lines in the FIG. 17. The battery 1338 accumulates power supplied form the vehicle.

In the car navigation apparatus 1320 shown in FIG. 15, the processing circuit 810 described with reference to FIG. 10 and the energy detecting unit 811 thereof may be implemented by the processor 1321, and the communicating unit 820 described with reference to FIG. 10 may be implemented by the wireless communication interface 1333. At least a part of the functions may also be implemented by the processor 1321. For example, the processor 1321 can implement the functions by executing instructions stored in the memory 1322.

The technology of the present disclosure may also be implemented as an in-vehicle system (or a vehicle) 1340 including one or more blocks of the car navigation apparatus 1320, the in-vehicle network 1341 and a vehicle module 1342. The vehicle module 1342 generates vehicle data (such as a vehicle speed, an engine speed or failure information), and outputs the generated data to the in-vehicle network 1341.

In the system and method according to the present disclosure, the respective components or steps can be decomposed and/or recombined. These decompositions and/or recombination shall be regarded as equivalent solutions of the present disclosure. Moreover, steps for executing the above series of processing can naturally be executed chronologically in the sequence as described above, but is not limited thereto, and some of the steps can be performed in parallel or individually.

Although the embodiments of the present disclosure have been described above in detail in connection with the drawings, it shall be appreciated that the embodiments as described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device in a wireless communication system, wherein the wireless communication system comprises at least one first cell and one or more second cells, and at least one of the one or more second cells operates in an unlicensed frequency band, wherein the electronic device comprises:
   one or more processing circuits configured to:
   configure, for each of a plurality of user equipment (UEs), the at least one second cell operating in the unlicensed frequency band, for carrier aggregation communication; and
   generate dynamically or semi-statically energy detection threshold information for each of the at least one second cell operating in the unlicensed frequency band on a basis of UE, in order to perform energy detection on the unlicensed frequency band based on the energy detection threshold information by at least one of the plurality of UEs, the energy detection threshold information being adjusted to be less than a first value and to be greater than a second value on a basis of UE, in accordance with determination whether each of the plurality of UEs is configured with a parameter related to energy detection threshold, the parameter being provided by a high-layer, and the first value being associated with absence or presence of any other interference system, and the second value being a preset dB value.

2. The electronic device according to claim 1, wherein the processing circuit contains the energy detection threshold information into radio resource control RRC signaling and notifies the at least one of the plurality of UEs.

3. The electronic device according to claim 1, wherein the energy detection threshold information comprises an energy detection threshold indication for the second cell operating in the unlicensed frequency band, and before generating the energy detection threshold information, the processing circuit is further configured to:
   contain a plurality of candidate energy detection thresholds into dedicated signaling and notify the at least one of the plurality of UEs.

4. The electronic device according to claim 1, wherein the processing circuit generates the energy detection threshold information based on traffic load and/or a channel idle probability of the unlicensed frequency band.

5. The electronic device according to claim 1, wherein the processing circuit is further configured to generate high-layer signaling containing configuration information on an energy detection report for the at least one of the plurality of UEs, and the configuration information on the energy detection report comprises a report parameter related to at least one of a periodic energy detection report and a non-periodic energy detection report.

6. The electronic device according to claim 5, wherein the configuration information on the energy detection report comprises a period of the periodic energy detection report and/or a triggering condition for the non-periodic energy detection report.

7. The electronic device according to claim 6, wherein the period of the periodic energy detection report and/or the triggering condition for the non-periodic energy detection report comprises timing threshold configurations of one or more timers.

8. The electronic device according to claim 1, wherein the processing circuit, in response to an energy detection report from the at least one of the plurality of UEs, determines whether to perform transmission using the second cell operating in the unlicensed frequency band.

9. The electronic device according to claim 1, wherein the processing circuit, in response to an energy detection report from the at least one of the plurality of UEs, adjusts the energy detection threshold information, in order to perform energy detection on the unlicensed frequency band based on the adjusted energy detection threshold information by the at least one of the plurality of UEs.

10. The electronic device according to claim 9, wherein the energy detection threshold information is dynamically adjusted by a downlink control information (DCI) format, based on the parameter provided by the high-layer.

11. The electronic device according to claim 1, wherein the electronic device is a base station, and further comprises a transceiver configured to transmit the energy detection threshold information via an air interface.

12. The electronic device according to claim 11, wherein the first cell operates in a licensed frequency band, and the transceiver is configured to transmit the energy detection threshold information via the first cell.

13. The electronic device according to claim 1, wherein energy detection thresholds for the at least one second cell are set based on a priority of the plurality of UEs.

14. The electronic device according to claim 13, wherein a first energy detection threshold which is to be set for the at least one second cell of a first UE of the plurality of UEs is greater than a second energy detection threshold which is to be set for the at least one second cell corresponding to a second UE of the plurality of UEs, when the priority of the first UE is higher than the priority of the second UE.

15. The electronic device according to claim 1, wherein one of the other interference system is a WiFi system.

16. The electronic device according to claim 15, wherein the second value is used to determine presence of the WiFi system as the other interference system.

17. A user equipment in a wireless communication system, wherein the wireless communication system comprises at least one first cell and one or more second cells, and at least one of the one or more second cells operates in an unlicensed frequency band, wherein the user equipment comprises:
a transceiver configured to receive configuration information on the at least one second cell operating in the unlicensed frequency band for carrier aggregation, and receive energy detection threshold information for each of the second cell operating in the unlicensed frequency band, the energy detection threshold information being generated dynamically or semi-statically for each of the at least one second cell operating in the unlicensed frequency band on a basis of user equipment, and being adjusted to be less than a first value and to be greater than a second value on a basis of user equipment, in accordance with determination whether the user equipment is configured with a parameter related to energy detection threshold, the parameter being provided by a high-layer, and the first value being associated with absence or presence of any other interference system, and the second value being a preset dB value; and
at least one processing circuit configured to perform energy detection on the unlicensed frequency band based on the energy detection threshold information.

18. The user equipment according to claim 17, wherein the processing circuit decodes radio resource control RRC signaling received by the transceiver, to extract the energy detection threshold information.

19. The user equipment according to claim 17, further comprising a memory, wherein the energy detection threshold information comprises an energy detection threshold indication for the second cell operating in the unlicensed frequency band, and the processing circuit decodes radio resource control RRC signaling received in advance by the transceiver to extract a plurality of candidate energy detection thresholds, and stores the plurality of the candidate energy detection thresholds in the memory.

20. The user equipment according to claim 17, wherein the transceiver is further configured to receive uplink transmission grant information on the second cell operating in the unlicensed frequency band, and perform uplink transmission in a case where an energy detection result on the second cell operating in the unlicensed frequency band indicates that the unlicensed frequency band is idle.

21. The user equipment according to claim 17, wherein the transceiver is further configured to receive high-layer signaling containing configuration information on an energy detection report for the user equipment, and the configuration information on the energy detection report comprises a report parameter related to at least one of a periodic energy detection report and a non-periodic energy detection report.

22. The user equipment according to claim 21, wherein the configuration information on the energy detection report comprises a period of the periodic energy detection report and/or a triggering condition for the non-periodic energy detection report.

23. The user equipment according to claim 22, wherein the period of the periodic energy detection report and/or the triggering condition for the non-periodic energy detection report comprises timing threshold configurations of the one or more timers.

24. The user equipment according to claim 23, wherein the triggering condition for the non-periodic energy detection report comprises one or more counting threshold configurations of the one or more counters.

25. A base station in a wireless communication system, wherein the base station manages a first cell operating in a licensed frequency band and a second cell operating in an unlicensed frequency band, and the base station comprises:
at least one processing circuit configured to:
generate a plurality of energy detection thresholds based on a network status, and contain the plurality of the energy detection thresholds into first signaling, the plurality of energy detection thresholds being adjusted to be less than a first value and to be greater than a second value on a basis of user equipment accordance with determination whether corresponding user equipment is configured with a parameter related to energy detection threshold, the parameter being provided by a high-layer, and the first value being associated with absence or presence of any other interference system, and the second value being a preset dB value; and
generate, for the second cell, an energy detection threshold indication for indicating one of the plurality of the energy detection thresholds in order to perform energy detection on the unlicensed frequency band corresponding to the second cell based on the energy detection threshold indication by the user equipment; and
contain the energy detection threshold indication into second signaling, wherein a transmission interval of the first signaling is longer than a transmission interval of the second signaling.

\* \* \* \* \*